(12) United States Patent
Kim

(10) Patent No.: US 10,913,481 B2
(45) Date of Patent: Feb. 9, 2021

(54) BABY CARRIAGE HAVING IMPROVED CONVENIENCE OF USE

(71) Applicant: BRAN-NEW INTERNATIONAL, Seoul (KR)

(72) Inventor: Mijin Kim, Bucheon-Si (KR)

(73) Assignee: BRAN-NEW INTERNATIONAL, Seoul (KR)

( * ) Notice: Subject to any disclaimer, the term of this patent is extended or adjusted under 35 U.S.C. 154(b) by 0 days.

(21) Appl. No.: 16/488,417

(22) PCT Filed: Apr. 3, 2019

(86) PCT No.: PCT/KR2019/003945
§ 371 (c)(1),
(2) Date: Aug. 23, 2019

(87) PCT Pub. No.: WO2019/198968
PCT Pub. Date: Oct. 17, 2019

(65) Prior Publication Data
US 2020/0331510 A1    Oct. 22, 2020

(30) Foreign Application Priority Data
Apr. 10, 2018 (KR) .................... 10-2018-0041743

(51) Int. Cl.
*B62B 9/12* (2006.01)
*B62B 9/28* (2006.01)
(Continued)

(52) U.S. Cl.
CPC ............... *B62B 9/12* (2013.01); *A47D 15/00* (2013.01); *B62B 7/06* (2013.01); *B62B 9/142* (2013.01);
(Continued)

(58) Field of Classification Search
CPC .. B62B 9/12; B62B 9/142; B62B 9/28; B62B 2206/006
See application file for complete search history.

(56) References Cited

U.S. PATENT DOCUMENTS 9,096,252 B2 * 8/2015 Thomas ................. B62B 7/06
9,534,628 B1 * 1/2017 Wang .................... B62B 9/12
(Continued)

FOREIGN PATENT DOCUMENTS

JP    2015-016818 A    1/2015
KR    10-1697545 B1    1/2017
(Continued)

*Primary Examiner* — Steve Clemmons
(74) *Attorney, Agent, or Firm* — Novick, Kim & Lee, PLLC; Jae Youn Kim

(57) ABSTRACT

Provided is a baby carriage having improved convenience of use configured to have a structure in which a baby carriage frame and a wagon frame are detachably coupled to a single baby transportation means frame such that the baby carriage frame and the wagon frame are optionally coupled to the left side and the right side of a single frame, in which the compatibility of the frame is excellent through the detachable coupling of a baby carriage seat and a wagon seat, whereby the baby carriage can be used without replacement during growth from a baby to a child, and in which it is possible for a single caregiver to operate the baby carriage in the state of carrying a maximum of four children using a single frame.

4 Claims, 30 Drawing Sheets

(51) Int. Cl.
*A47D 15/00* (2006.01)
*B62B 7/06* (2006.01)
*B62B 9/14* (2006.01)
*B62B 7/00* (2006.01)

(52) U.S. Cl.
CPC ............... *B62B 7/008* (2013.01); *B62B 9/28* (2013.01); *B62B 2206/006* (2013.01)

(56) References Cited

U.S. PATENT DOCUMENTS

| | | | |
|---|---|---|---|
| 9,962,011 B1* | 5/2018 | Eyman | B62B 9/14 |
| 10,150,496 B2* | 12/2018 | Oakes | B62B 9/20 |
| 2010/0148473 A1* | 6/2010 | Vieira | B62B 9/28 |
| | | | 280/642 |
| 2014/0159346 A1* | 6/2014 | Laffan | B62B 9/20 |
| | | | 280/650 |
| 2015/0042056 A1* | 2/2015 | Sparling | B62B 7/145 |
| | | | 280/47.35 |
| 2015/0232115 A1* | 8/2015 | Fleming | B62B 7/145 |
| | | | 280/656 |
| 2016/0059876 A1* | 3/2016 | Strauss | B62B 7/06 |
| | | | 280/650 |

FOREIGN PATENT DOCUMENTS

| | | | | |
|---|---|---|---|---|
| KR | 10-1719132 B1 | 3/2017 | | |
| KR | 101719132 B1 * | 3/2017 | ............... | B62B 7/12 |
| KR | 20-0483642 Y1 | 6/2017 | | |
| KR | 10-1834474 B1 | 3/2018 | | |

\* cited by examiner

BABY CARRIAGE HAVING IMPROVED CONVENIENCE OF USE

TECHNICAL FIELD

The present invention relates to a baby carriage having improved convenience of use configured to have a structure in which a baby carriage frame and a wagon frame are detachably coupled to a single baby transportation means frame to be interchangeably used depending on the age of the child. Due to the detachable coupling of the baby carriage seat and the wagon seat, both seats are compatible on one frame, and the baby carriage can be used without replacement during the period of growth from a baby to a child.

BACKGROUND ART

A baby carriage and a child wagon, which are used as means for transportation and outings for babies or children, are necessary for homes having babies. Various kinds of products having various functions have come out onto the market.

Depending on necessity, a baby carriage, which provides safety and comfort for babies, is suitable for homes having babies, and a child wagon, which has a wide space that allows children to lie down or play, is suitable for homes having children.

However, a conventional baby transportation means is manufactured to have a single fixed frame, so that a baby carriage and a child wagon cannot be detachably coupled to the frame and therefore the baby carriage and the child wagon cannot be interchangeably used. For this reason, even for a single-child home, having both a baby carriage and a child wagon are required depending on the age of the child.

In addition, for a home having multiple children, a plurality of baby carriages and child wagons are required at the time of going out. In cases where the age difference between the children is great, the wagon and the baby carriage must be simultaneously used, whereby initial purchase expense is high. Furthermore, it is not possible for a single caregiver to simultaneously operate the baby carriage and the wagon, whereby going out is difficult and inconvenient. Moreover, the baby carriage and the wagon occupy large volumes at the time of storage.

DISCLOSURE

Technical Problem

The present invention has been made in view of the above problems, and it is an object of the present invention to provide a baby carriage having improved convenience of use configured to have a structure in which a baby carriage frame and a wagon frame are detachably coupled to a single baby transportation frame to be interchangeably used depending on the age of children, in which the baby carriage frame and the wagon frame are optionally coupled to the left side and the right side of a single frame, whereby the baby carriage can be easily used in homes having a great difference between the ages of children and homes having multiple children. The detachable coupling of a baby carriage seat and a wagon seat on the frame allows for a single caregiver to operate one single carriage frame, carrying up to a maximum of four children, and also allows the carriage to be used without replacement during the growth from a baby to a child, thus reducing the initial purchase expense.

Technical Solution

In accordance with the present invention, the above and other objects can be accomplished by the provision of a baby carriage having improved convenience of use, the baby carriage optionally including one of:

The baby carriage optionally includes one of a single baby carriage frame and a twin baby carriage frame. The single baby carriage frame has a structure in which a support frame and a side inclination frame are coupled to each other in order to first form a first main frame. The support frame is shaped horizontally and has a rectangular rim shape. The side inclination frame is formed by connecting the rear ends of two frames in a perpendicular manner so that they extend parallel to each other in an inclined state. The front surface of the side inclination frame is configured to have a hinge structure. When the support frame and the side inclination frame are conjoined, a wheel unit is formed at the left and right sides of the front surface, and the rear surface of the support frame in a symmetrical fashion, and the seat frame is coupled to a side inclination bracket that is coupled to one side of the middle of the side inclination frame.

The twin baby carriage frame has a structure in which a support frame and a side inclination frame are coupled to each other in order to first form a second main frame. The support frame is shaped horizontally and has a rectangular rim shape. The side inclination frame is formed by connecting the rear ends of two frames in a perpendicular manner so that they extend parallel to each other in the inclined state. The front surface of the side inclination frame is configured to have a hinge structure. When the support frame and the side inclination frame are conjoined to each other in order to form the second main frame, a wheel unit is formed at the left and right sides of the front surface and the rear surface of the support frame in a symmetrical fashion. The seat frame is coupled to the left and right sides of the inner surface of the side inclination bracket, which is coupled to one side of the middle of the inclination frame.

Advantageous Effects

As is apparent from the above description, a baby carriage having improved convenience of use according to the present invention has the following effects. A baby carriage frame and a wagon frame are detachably coupled to a single baby transportation frame, whereby it is possible to interchangeably use a baby carriage and a child wagon depending on the age of children. In addition, the baby carriage frame and the wagon frame are optionally coupled to the left side and the right side of a single frame such that a twin baby carriage and a twin wagon can be interchangeably used, whereby it is possible to easily use the baby carriage according to the present invention in homes having a great difference between the ages of children and homes having multiple children. In particular, the baby carriage seat and the wagon seat are compatible on a single frame due to the detachable coupling of the seats, whereby it is possible to use the baby carriage without replacement during growth from a baby to a child, and therefore it is possible to reduce initial purchase expense. Furthermore, it is possible for a single caregiver to operate the baby carriage in the state of carrying a maximum of four children using a single frame.

BEST MODE

Figure 1:
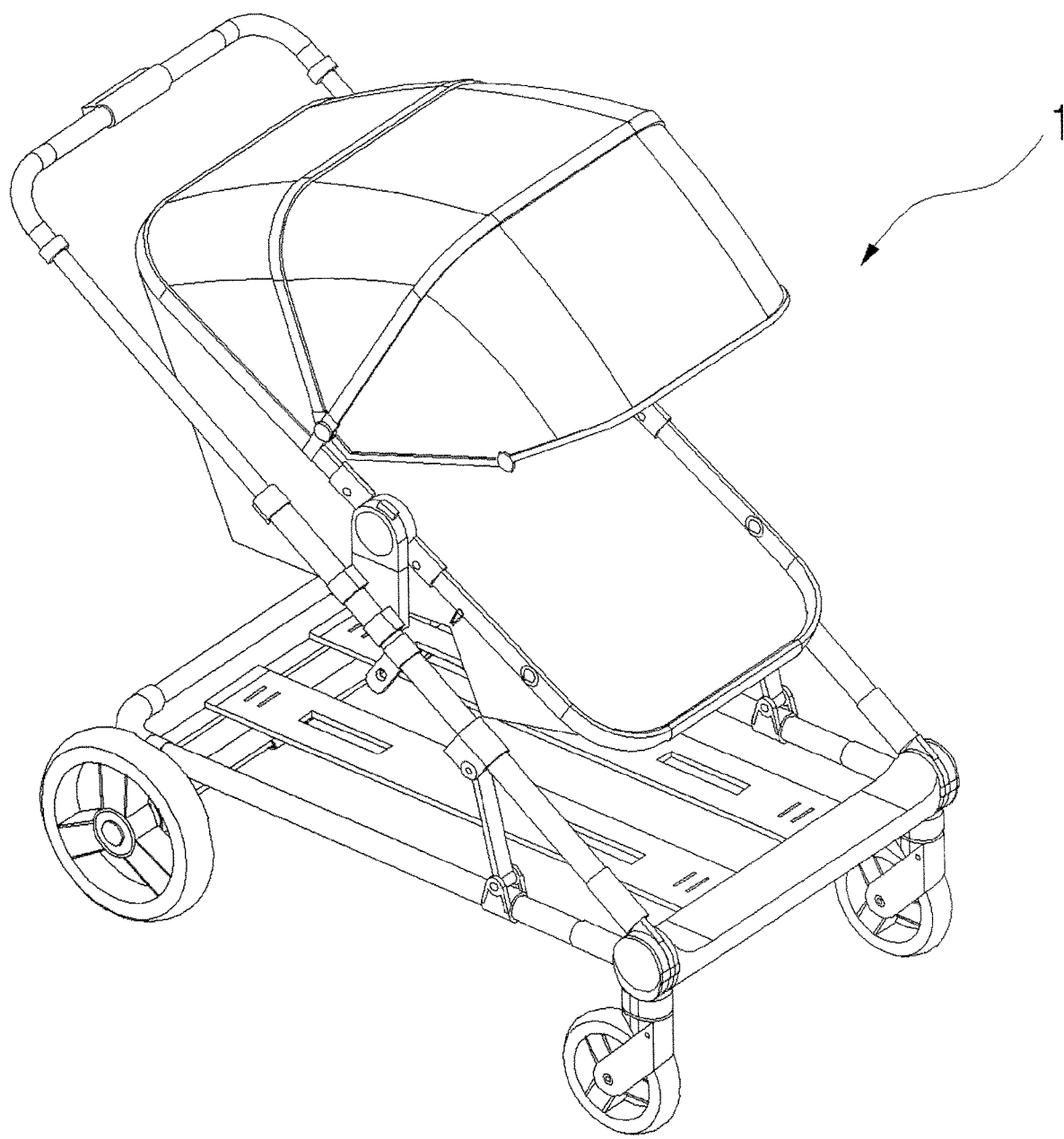
FIG. 1 is a perspective view showing the overall shape of a single baby carriage frame, to which a baby carriage seat frame is coupled and on which a baby carriage seat is installed to form a baby carriage having improved convenience of use according to the present invention.
Figure 2:
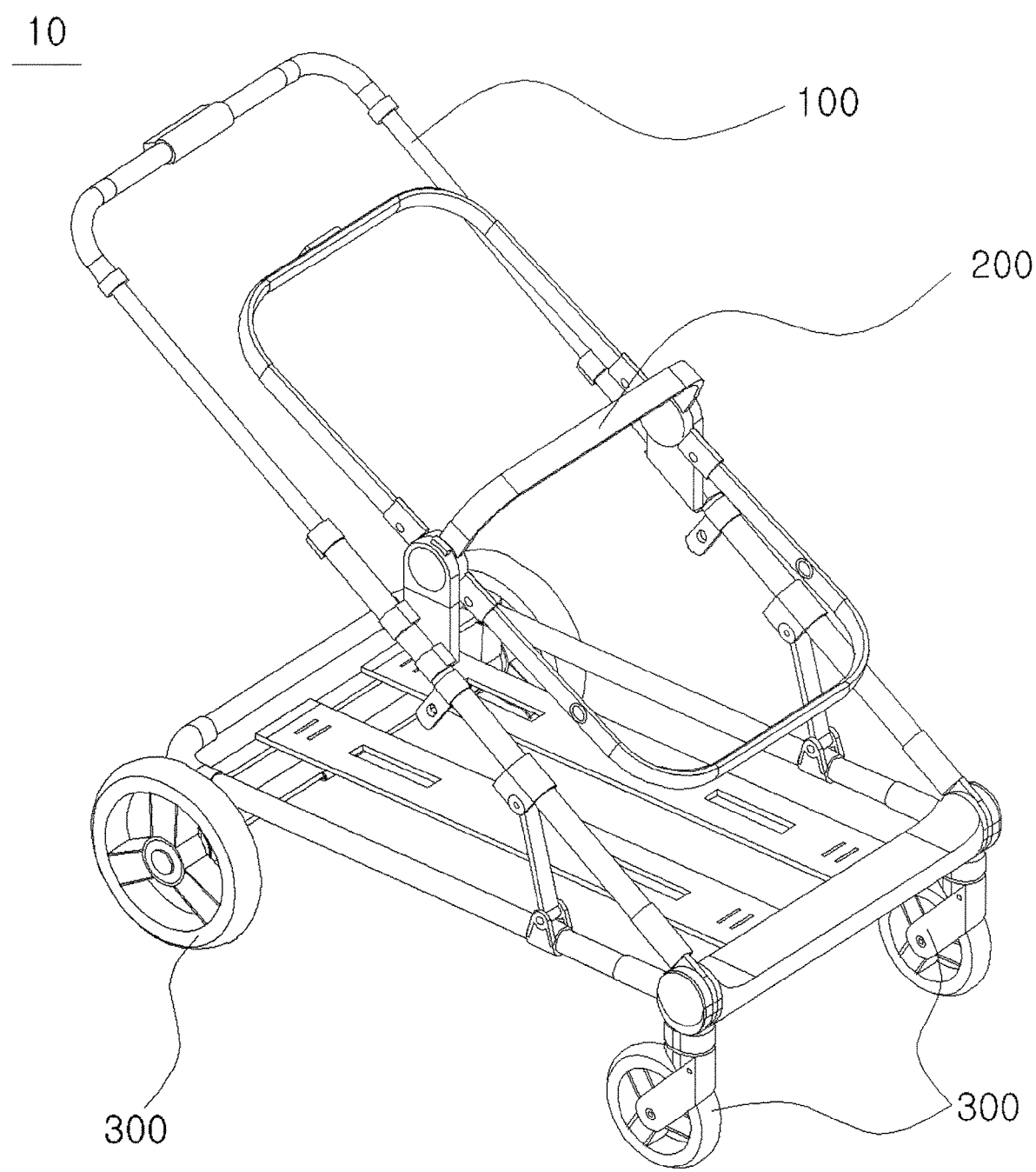
FIG. 2 is a perspective view showing the overall shape in which the baby carriage seat frame is coupled to the single baby carriage frame according to the present invention.
Figure 3:
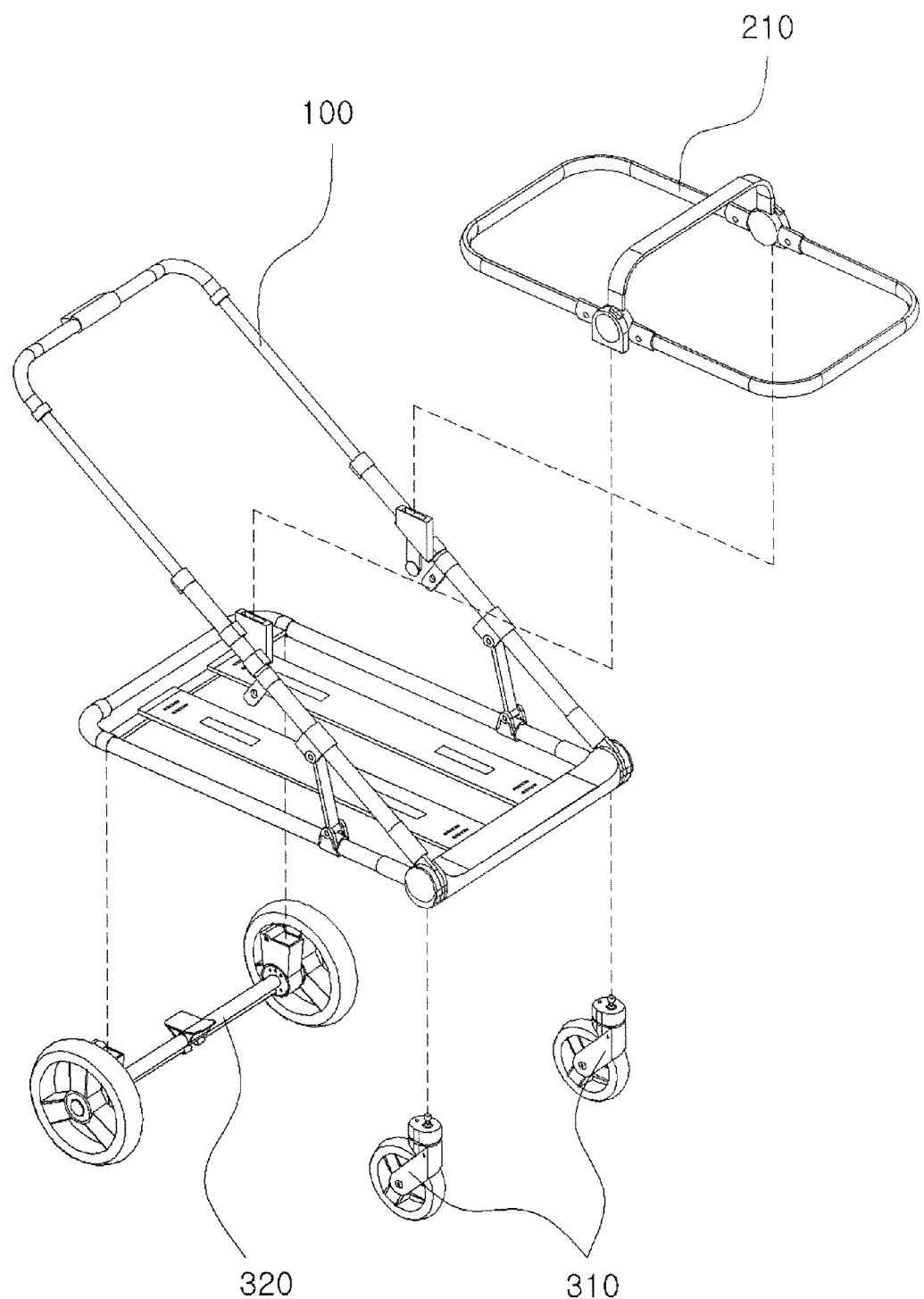
FIG. 3 is an exploded perspective view showing elements constituting the single baby carriage frame, to which the baby carriage seat frame according to the present invention is coupled.
Figure 4:
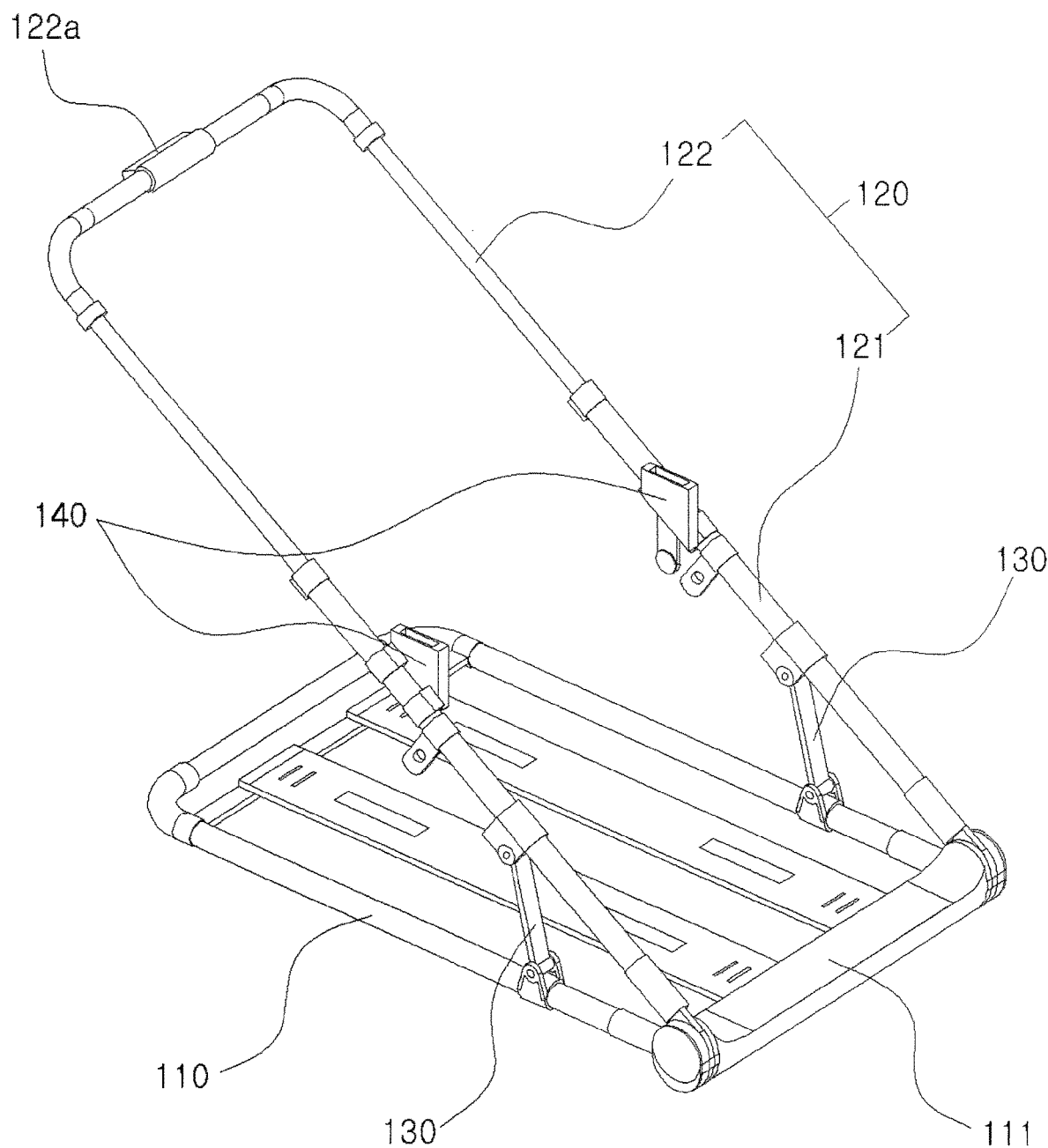
FIG. 4 is a perspective view showing elements constituting a first main frame according to the present invention.
Figure 5:
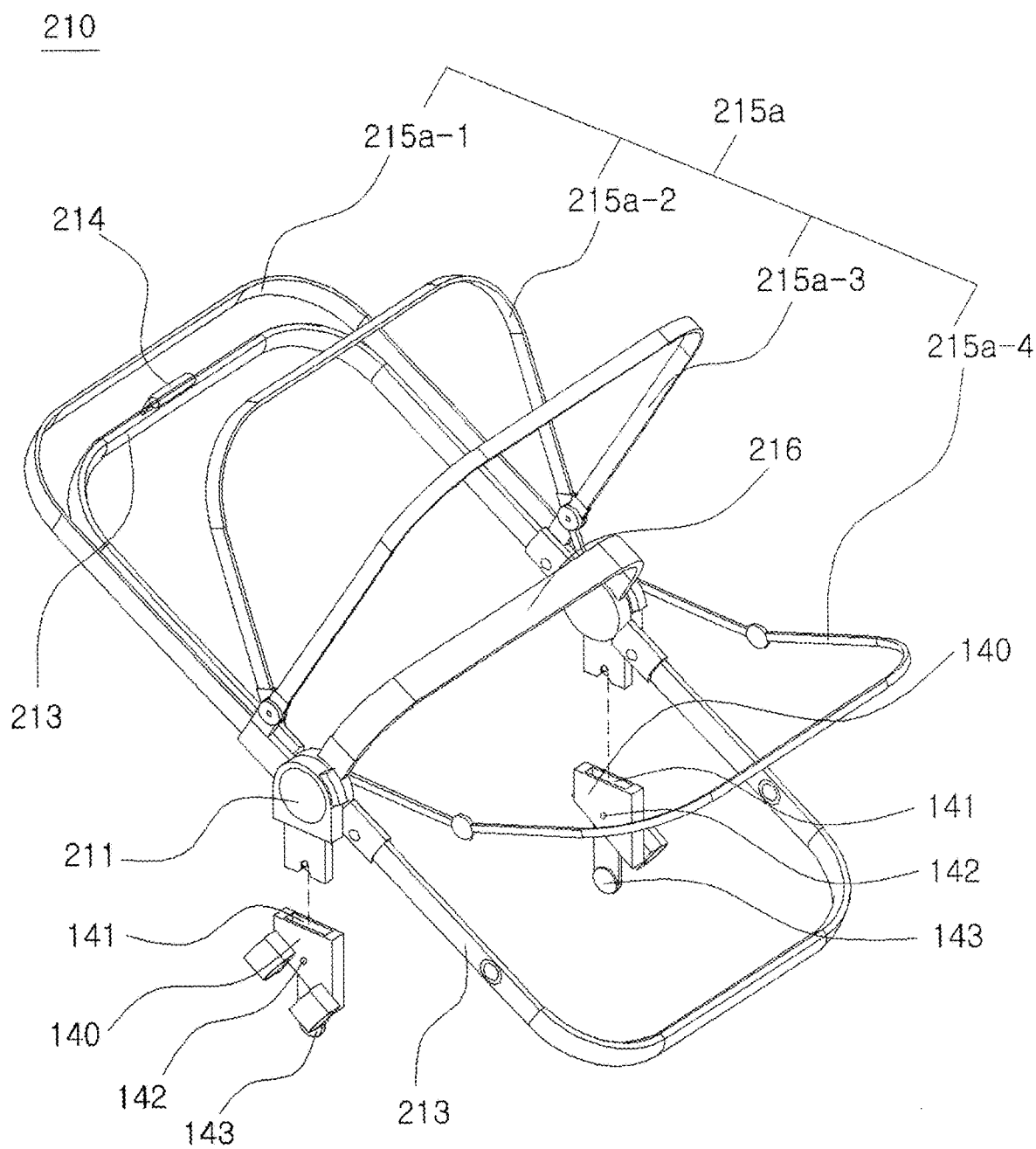
FIG. 5 is a perspective view showing elements constituting the baby carriage seat frame, to which an upper-end cover canopy according to the present invention is coupled.
Figure 6:
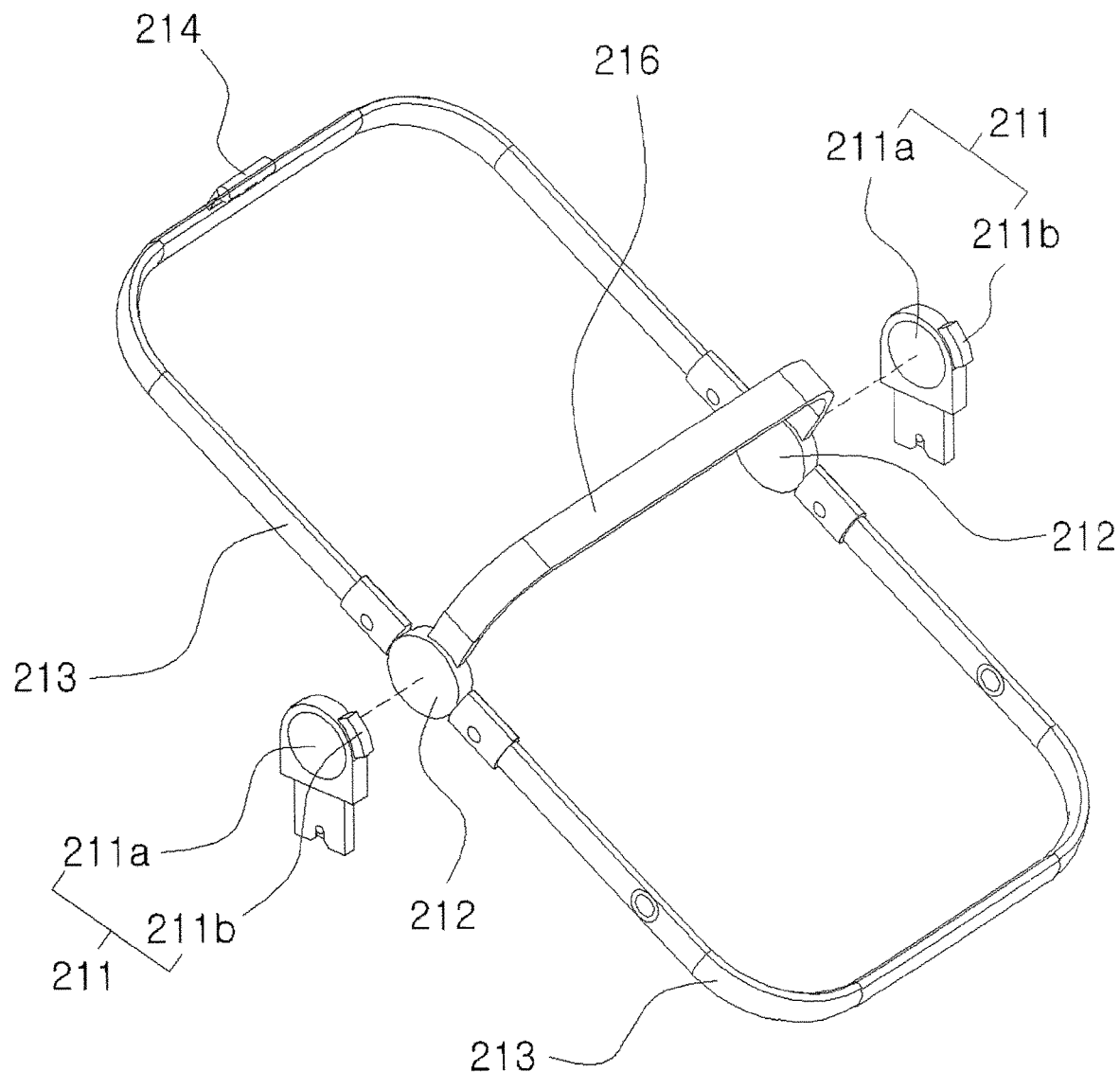
FIG. 6 is a perspective view showing the elements constituting the baby carriage seat frame according to the present invention.
Figure 7:
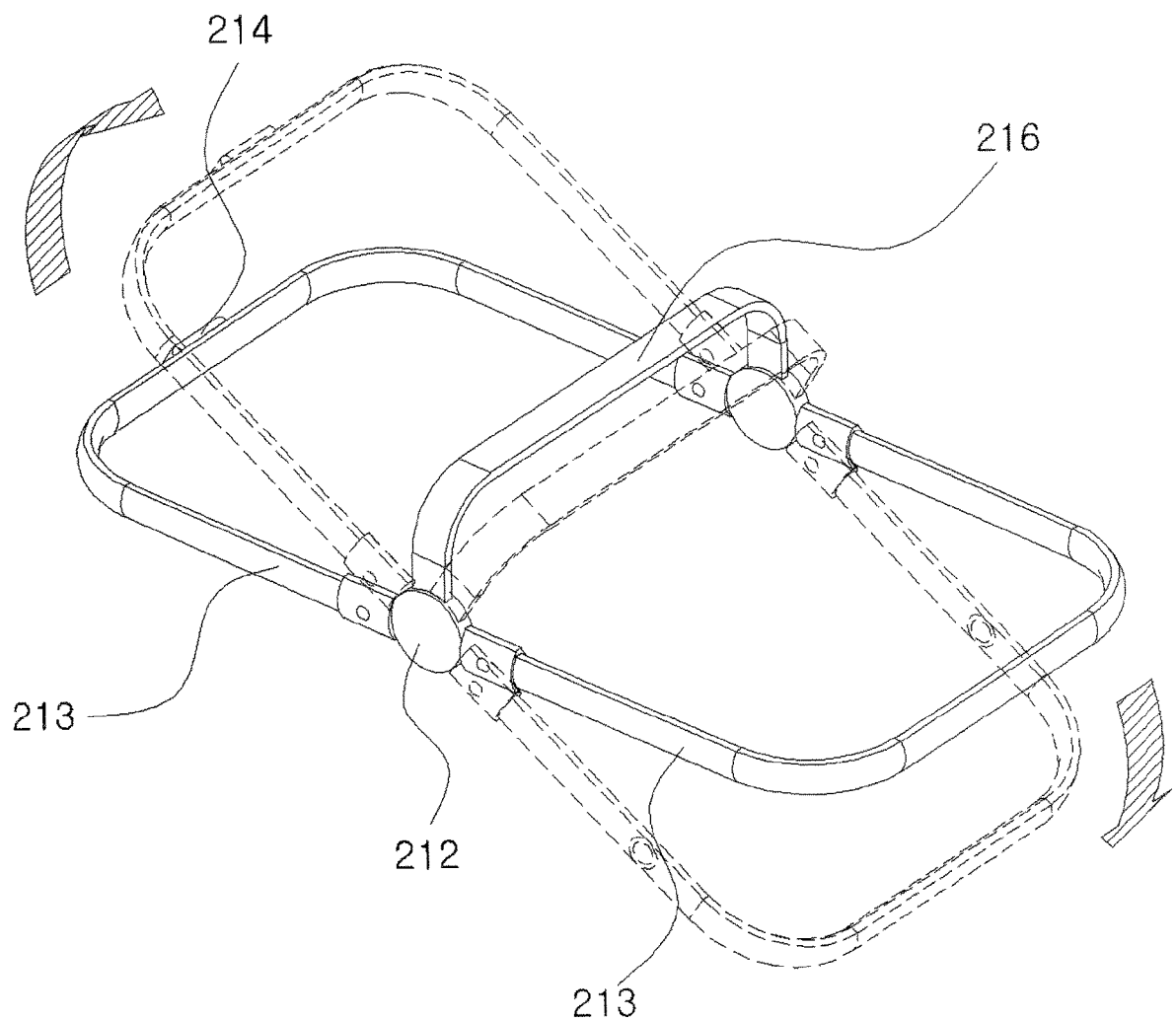
FIG. 7 is a perspective view showing an embodiment in which the baby carriage seat frame according to the present invention is rotated in the upward or downward direction about a baby carriage rotation control unit.

A baby carriage having improved convenience of use, the baby carriage optionally including one of: a single baby carriage frame (10) and a twin baby carriage frame (20). The single baby carriage frame has a structure in which a support frame, which is formed horizontally and has a rectangular rim shape, and a side inclination frame, which has a shape formed by connecting the rear ends of two frames, extending parallel to each other in an inclined state, to each other in a perpendicular state and the front surface of which is configured to have a hinge structure, are coupled to each other in order to form a first main frame, a wheel unit is formed at the left and right sides of the front surface and the rear surface of the support frame in a symmetrical fashion, and a seat frame is coupled to a side inclination bracket coupled to one side of the middle of the side inclination frame.

The twin baby carriage frame has a structure in which support frames, each of which has a rectangular rim shape that is formed horizontally, are coupled to each other in a symmetrical fashion, and an inclination frame, which has a shape formed by connecting the rear ends of three frames, extending parallel to each other in an inclined state, to each other in a perpendicular state and the front surface of which is configured to have a hinge structure, are coupled to each other in order to form a second main frame, a wheel unit is formed at the left and right sides of the front surface and the rear surface of the support frame in a symmetrical fashion, and a seat frame is coupled to the left and right sides of the inner surface of a side inclination bracket coupled to one side of the middle of the inclination frame.

The single baby carriage frame (10) includes a first main frame (100).

The first main frame (100) includes a support frame (110), which is formed horizontally and has a rectangular rim shape, a side inclination frame (120), which has a shape formed by connecting the rear ends of two frames, extending parallel to each other in an inclined state, to each other in a perpendicular state and which is coupled to the support frame at the front surface thereof via a hinge structure such that the front of the side surface thereof forms an angle through the hinge structure in order to completely support a main body of the baby carriage, a foldable rotation locking device (130) fixedly coupled to one side of the support frame and movably coupled to one side of the side inclination frame in a symmetrical fashion so as to be movable in the upward-downward direction in response to the rotation of the side inclination frame, and a side inclination bracket (140) coupled to one side of the middle of the side inclination frame, the first main frame being folded or unfolded about the lower end of the front surface of the first main frame through a hinge structure thereof, whereby the shape of the first main frame is changed.

The first main frame further includes a seat frame (200), which is a frame that is coupled to one side of the middle of the inside of the side inclination frame in the leftward-rightward direction and has a rectangular rim shape, a seat being coupled to the seat frame, whereby the seat is supported.

The first main frame further includes a wheel unit (300) constituted by driving wheels coupled to the left and right sides of the front surface and the rear surface of the support frame in a symmetrical fashion in order to drive the baby carriage.

The seat frame (200) optionally includes one of a baby carriage seat frame (210) and a wagon seat frame (220).

The baby carriage seat frame (210) has a rectangular rim shape, and is vertically inserted into a coupling pin insertion recess (141), formed in the upper end surface of the side inclination bracket, and supports a baby carriage seat, which is rotated in the upward-downward direction about a rotary shaft formed at the middle thereof in the leftward-rightward direction.

The wagon seat frame (220) has a rectangular rim shape, and is coupled to a wagon seat coupling bar (143), which protrudes from the lower end of the side inclination bracket, the left and right sides of the front and the rear of the wagon seat frame being fixed in symmetrical fashion, the wagon seat frame being erected in the lower-end direction so as to be coupled to the support frame and to support a wagon seat in the horizontal direction.

The baby carriage seat frame (210) includes: a baby carriage coupling unit (211).

The baby carriage coupling unit (211) is formed as a rectangular frame, the upper end of which is formed in a cylindrical shape erected laterally, and the lower end of which coincides with the circumference of the coupling pin insertion recess (141) of the side inclination bracket, the baby carriage coupling unit configured to couple the baby carriage seat frame to the side inclination frame.

The baby carriage seat frame further includes a baby carriage rotation control unit (212), which has a cylindrical shape, the middle of which is erected laterally, and is coupled to the inner surface of the upper end of the baby carriage coupling unit, which is formed at the left and right sides thereof, a protruding support for supporting the baby carriage seat main frame being formed at each of the front surface and the rear surface of the baby carriage rotation control unit, a baby handle bar fixing unit for fixing a baby handle bar being formed at the upper end surface of the baby carriage rotation control unit, the inside of the baby carriage rotation control unit being connected to a baby carriage rotation handle unit in order to rotate the baby carriage seat frame.

The baby carriage seat frame further includes a baby carriage seat main frame (213) having a rectangular rim shape in which a frame having a shape formed by connecting the outer ends of two frames, extending parallel to each other, to each other in a perpendicular state is coupled to the front surface and the rear surface of the baby carriage rotation control unit in a symmetrical fashion, the baby carriage seat main frame being configured to support a baby carriage seat.

The baby carriage seat frame further includes baby carriage rotation handle unit (214) configured such that a handle is formed at the middle of the rear surface of the baby carriage seat main frame in the outward direction and such that a wire is inserted along the inside of a rear baby carriage seat main frame in order to rotate or fix the baby carriage rotation control unit.

The baby carriage seat frame further includes a canopy frame (215) constituted by a plurality of frames, each of which is coupled to one side of the rear of the side surface of the baby carriage coupling unit in a symmetrical fashion and each of which has a shape formed by connecting the outer ends of two frames, extending parallel to each other, to each other in a perpendicular state, the canopy frame being rotated in the upward-downward direction so as to be unfolded at the upper end of the baby carriage seat frame in a fan shape or to be folded.

MODE FOR INVENTION

Hereinafter, an exemplary embodiment of the present invention will be described with reference to the drawings.

FIG. 1 is a perspective view showing the overall shape of a baby carriage 1 having improved convenience of use according to the present invention. The baby carriage optionally includes any one of a single baby carriage frame 10 and a twin baby carriage frame 20.

First, the single baby carriage frame 10 according to the present invention will be described.

The single baby carriage frame 10 has a structure in which a support frame and a side inclination frame are coupled to each other in order to first form a first main frame. The support frame is shaped horizontally and has a rectangular rim shape. The side inclination frame is formed by connecting the rear ends of two frames in a perpendicular manner so that they extend parallel to each other in the inclined state. The front surface of the side inclination frame is configured to have a hinge structure. When the support frame and the side inclination frame are conjoined, a wheel unit is formed at the left and right sides of the front surface, and the rear surface of the support frame is in a symmetrical fashion. The seat frame is coupled to a side inclination bracket, which is coupled to one side of the middle of the side inclination. The single baby carriage frame includes a first main frame 100, a seat frame 200, and a wheel unit 300.

The first main frame 100 includes a support frame 110, which is formed horizontally and has a rectangular rim shape, and a side inclination frame 120, which has a shape formed by connecting the rear ends of two frames in a perpendicular manner so that they extend parallel to each other in the inclined state. The front surface of the side inclination frame 120 is configured to have a hinge structure such that the front of the side surface thereof forms an angle through the hinge structure in order to completely support the main body of the baby carriage. The hinge structure can have a foldable rotation locking device 130, fixedly coupled to one side of the support frame and movably coupled to one side of the side inclination frame in a symmetrical fashion so as to be movable in the upward or downward direction in response to the rotation of the side inclination frame, and a side inclination bracket 140 coupled to one side of the middle of the side inclination frame. The first main frame can be folded or unfolded about the lower end of the front surface of the first main frame through the hinge structure thereof, whereby the shape of the first main frame is changed.

Here, the support frame 110 is a frame that constitutes the lower end of the baby carriage, has a rectangular rim shape, and is formed in the horizontal direction. A support plate is formed inside the support frame in a symmetrical fashion as to extend in the forward-rearward longitudinal direction thereof.

A main rotary shaft 111 is formed in the front of the support frame as to extend in the leftward-rightward direction, and supports shaft coupling of the side inclination frame.

Here, the side inclination frame 120, which is a frame formed by connecting the rear ends of two frames in a perpendicular manner so that they extend parallel to each other in the inclined state. The side inclination frame 120 is coupled to a main rotary shaft, formed at the front of the support frame in the leftward-rightward direction, via a hinge structure, and serves to support the seat frame, which is coupled to the left and right inner surfaces of one side of the middle thereof. The side inclination frame includes an outer cylindrical frame 121 and a handle frame 122.

At this time, the outer cylindrical frame 121 has a hollow cylindrical shape formed at the left and right side surfaces of the front thereof. The end of the outer cylindrical frame is axially coupled to the main rotary shaft, formed at the front of the support frame so as to be rotated. The outer cylindrical frame constitutes the lower end of the side inclination frame, receives the lower ends of the left and right sides of the handle frame in the inward direction, and serves to support the upward and downward movement of the handle frame.

At this time, the handle fame 122 is a frame formed by connecting the rear ends of two frames in a perpendicular manner so that they extend parallel to each other in the inclined state. The lower end of the front of the handle frame is inserted into the outer symmetrical cylindrical frame in the longitudinal direction, and a handle length-adjustment button 122a is formed at the upper end of the handle frame in the inward direction in order to adjust the length of a handle.

Here, the foldable rotation locking device 130 is formed between the support frame and the side inclination frame, which are coupled to each other at the left and right sides thereof in a symmetrical fashion, and is connected to a locking switch 131 located at the lower end of one side of the middle of the side inclination frame in order to fix the side inclination frame, which can be rotated in the upward or downward direction according to the axial rotation of the main rotary shaft.

Here, the side inclination bracket 140 is coupled to one side of the middle of each of the left and right side surfaces of the side inclination frame in a symmetrical fashion. The side inclination bracket is provided in the upper end surface thereof, which is formed horizontally in the inward direction with a coupling pin insertion recess 141, into which the lower end of a coupling body 211a of the baby carriage coupling unit is inserted. A detachment pin 142 is formed on the middle of the lower end of the inside of the coupling pin insertion recess, and a wagon seat coupling bar 143 is formed so as to protrude in the lower-end direction.

At this time, the coupling pin insertion recess 141 is a recess formed in the middle of the upper end surface of the side inclination bracket 140 in the vertical direction, and the lower end of the coupling body 211a is vertically inserted thereinto, whereby the coupling body is supported.

At this time, the detachment pin 142 is a circular pin formed inside one side of the middle of the lower end of the coupling pin insertion recess 141 in the leftward-rightward direction, and is detached from or coupled to a coupling hook 211c-1, located at the lower end of a coupling hook frame 211c formed in the coupling body, in order to detach and couple the baby carriage seat frame.

At this time, the wagon seat coupling bar 143 is a bar-shaped frame coupled to one side of the middle of the lower end of the side inclination bracket 140 in the vertical direction, and couples one side of the middle of a wagon seat frame 220 to the inside of the middle of the lower end thereof in order to support the wagon seat frame.

In the case in which a baby carriage seat frame 210 is optionally coupled into the coupling pin insertion recess 141 formed in the upper end of the side inclination bracket 140 according to the present invention, the baby carriage according to the present invention may be used in the form of a single baby carriage. In the case in which the wagon seat frame 220 is coupled to the wagon seat coupling bar 143 formed at the lower end thereof, the baby carriage according to present invention may be used in the form of a single wagon.

Consequently, the baby carriage seat frame 210 may be detachably coupled to the first main frame such that the baby carriage according to the present invention is used in the form of a single baby carriage, and the wagon seat frame 220 may be detachably coupled to the first main frame such that the baby carriage according to the present invention is used in the form of a single wagon, whereby the single baby carriage and the single wagon may be interchangeably used depending on the age of children or depending on the purpose of the user.

In addition, when the wagon seat frame 220 is coupled to the side inclination bracket 140, a canopy frame 215 may be inserted into the coupling pin insertion recess 141.

The seat frame 200 is a frame that is coupled to one side of the middle of the inside of the side inclination frame in the leftward-rightward direction and has a rectangular rim shape, and a seat is coupled to the seat frame, whereby the seat is supported.

The seat frame optionally includes one of a baby carriage seat frame 210 and a wagon seat frame 220.

The baby carriage seat frame 210 has a rectangular rim shape, is vertically inserted into the coupling pin insertion recess 141, formed in the upper end surface of the side inclination bracket, and supports a baby carriage seat, which can be rotated in the upward or downward direction about a rotary shaft formed at the middle thereof in the leftward-rightward direction. The baby carriage seat frame includes a baby carriage coupling unit 211, a baby carriage rotation control unit 212, a baby carriage seat main frame 213, a baby carriage rotation handle unit 214, and a canopy frame 215.

The baby carriage coupling unit 211 is formed as a rectangular frame, the upper end of which is formed in a cylindrical shape erected laterally and the lower end of which coincides with the circumference of the coupling pin insertion recess 141 of the side inclination bracket and serves to couple the baby carriage seat frame to the side inclination frame.

Figure 10:
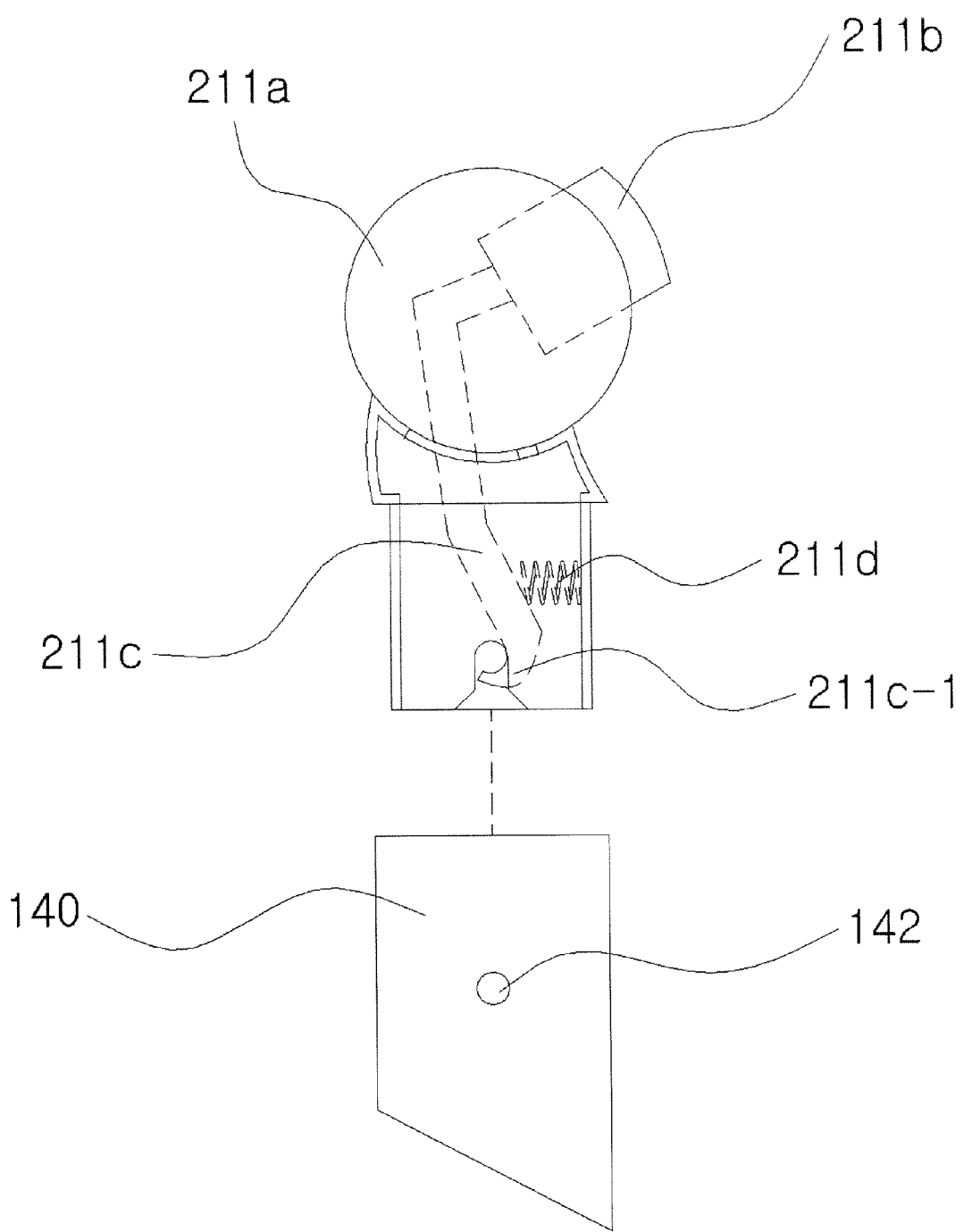
FIG. 10 is a side see-through view showing internal elements constituting a baby carriage coupling unit according to the present invention, with a side see-through view showing an embodiment coupled to a side inclination bracket.

As shown in FIG. 10, the baby carriage coupling unit includes a coupling body 211a, a decoupling switch 211b, a coupling hook frame 211c, and a compression spring 211d.

Here, the lower end of the coupling body 211a is vertically inserted into or detached from the coupling pin insertion recess 141, which is formed in the upper end surface of the side inclination bracket, so as to be coupled thereto or detached therefrom. The baby carriage rotation control unit 212 is coupled to the inner surface of the coupling body.

Here, the decoupling switch 211b protrudes from one side of the front of the upper end of the coupling body 211a, and is formed as a push button.

Here, the coupling hook frame 211c is received in the coupling body, and is coupled to the lower end of the inside of the decoupling switch 211b. A coupling hook 211c-1, which is configured in a hook shape, is formed at the lower end of the coupling hook frame, and is detachably coupled to the detachment pin 142, which is formed at the inside of the side inclination frame.

Figure 11:
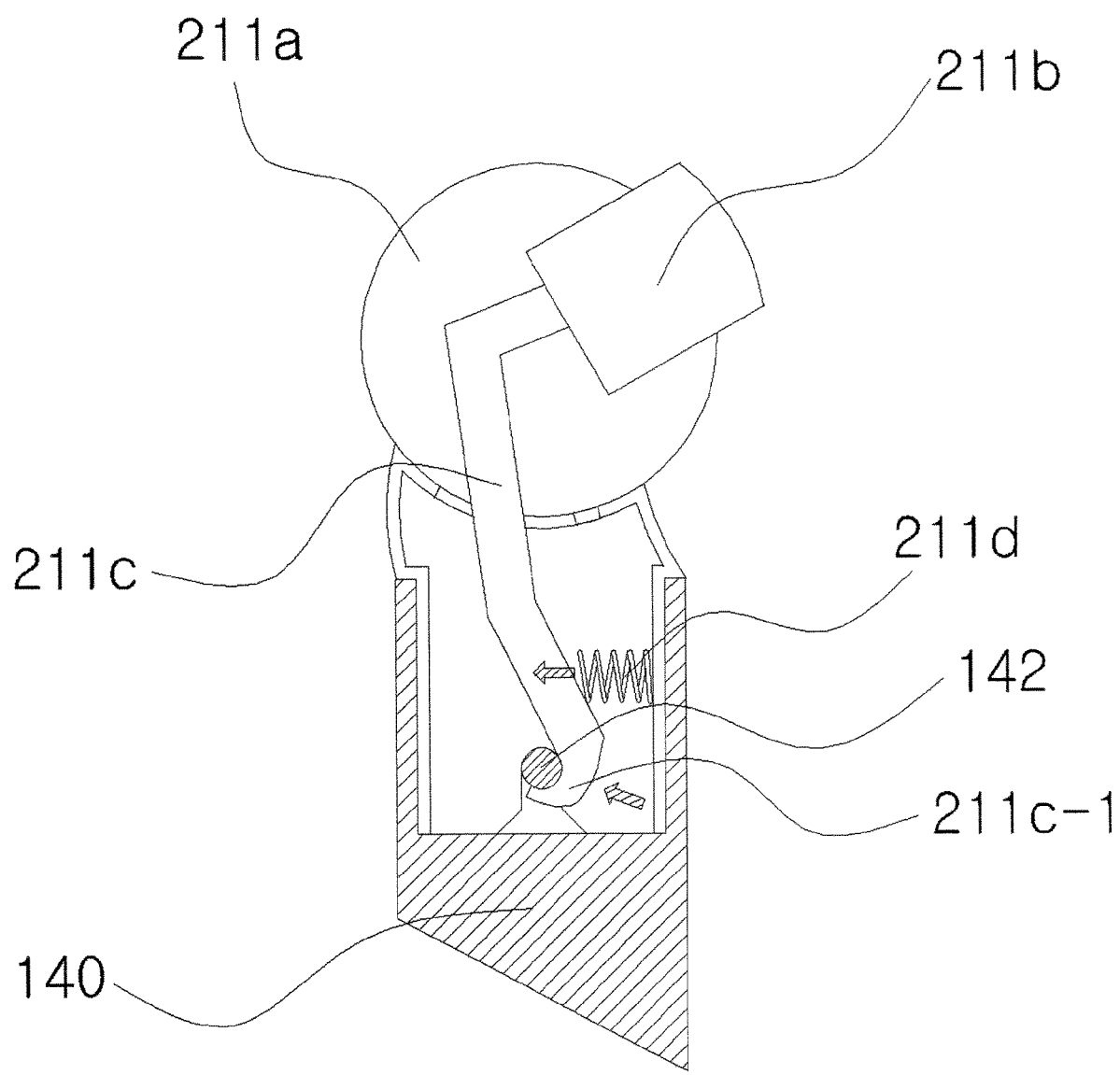
FIG. 11 is a side sectional view showing the baby carriage coupling unit according to the present invention.
Figure 12:
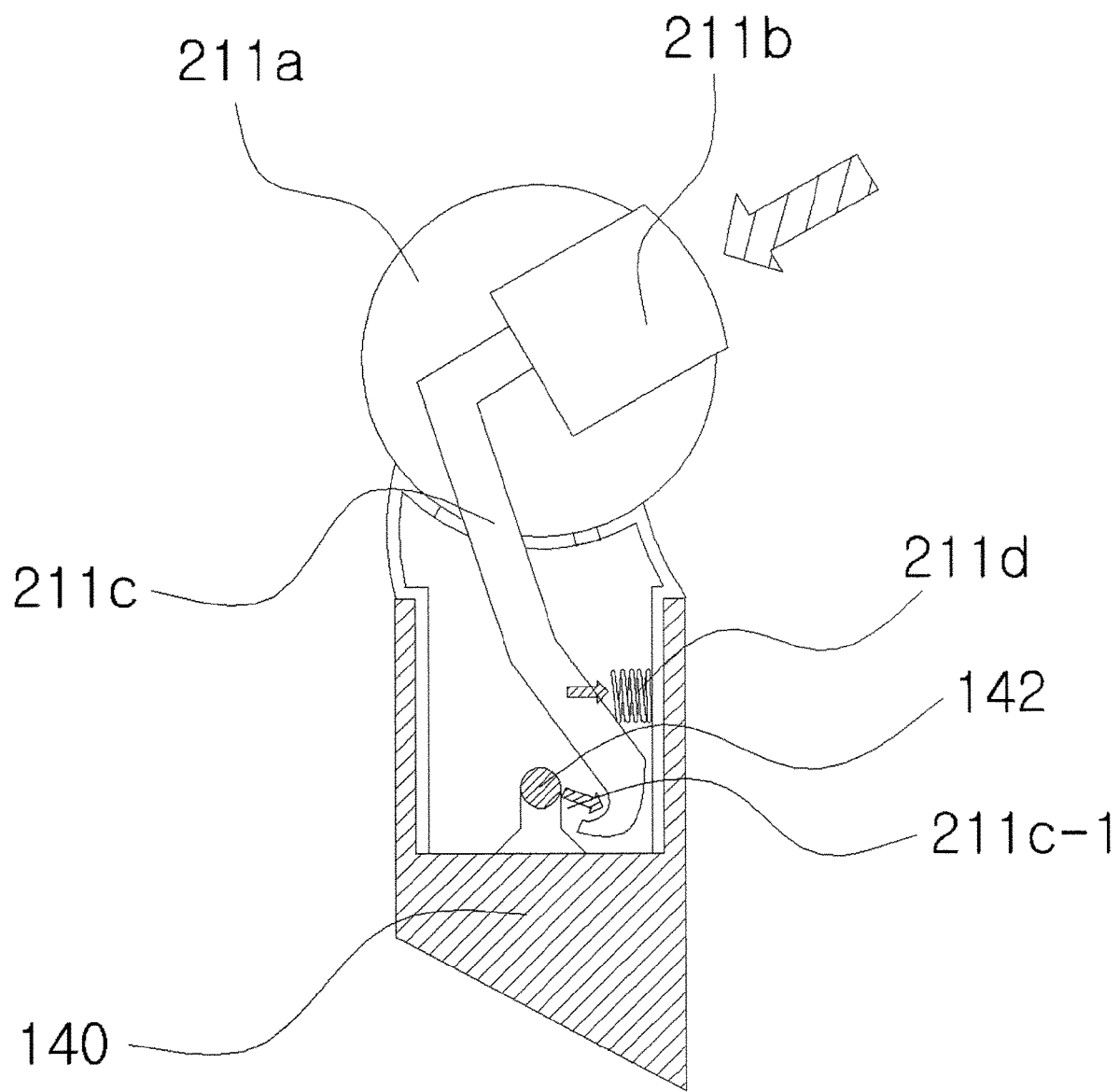
FIG. 12 is a side sectional view showing an embodiment of the baby carriage coupling unit in the state in which a detachment switch according to the present invention is pushed.

In the state in which the decoupling switch is not pushed, as shown in FIG. 11, the front of the lower end of the coupling hook frame is pushed rearwards by the compression spring, whereby the coupling hook 221c-1 is caught by the detachment pin 142, and therefore the baby carriage seat frame 210 is fixed to the side inclination bracket 140. In the state in which the decoupling switch is pushed, as shown in FIG. 12, the front of the lower end of the coupling hook frame is rotated toward the compression spring, whereby the coupling hook 221c-1 is detached from the detachment pin 142, and therefore the baby carriage seat frame 210 is detached from the side inclination bracket 140.

Here, the compression spring 211d is formed at one side of the front of the inner surface of the coupling body in the forward-rearward direction, and is compressed and restored according to the forward and rearward movements of the coupling hook frame in order to return the decoupling switch and the coupling hook frame to the original positions thereof.

The baby carriage rotation control unit 212 has a cylindrical shape, the middle of which is erected laterally, and is coupled to the inner surface of the upper end of the baby carriage coupling unit, which is formed at the left and right sides thereof. A protruding support for supporting the baby carriage seat main frame is formed at each of the front surface and the rear surface of the baby carriage rotation control unit. A baby handle bar fixing unit for fixing a baby handle bar is formed at the upper end surface of the baby carriage rotation control unit, and the inside of the baby carriage rotation control unit is connected to the baby carriage rotation handle unit in order to rotate the baby carriage seat frame.

Figure 8:
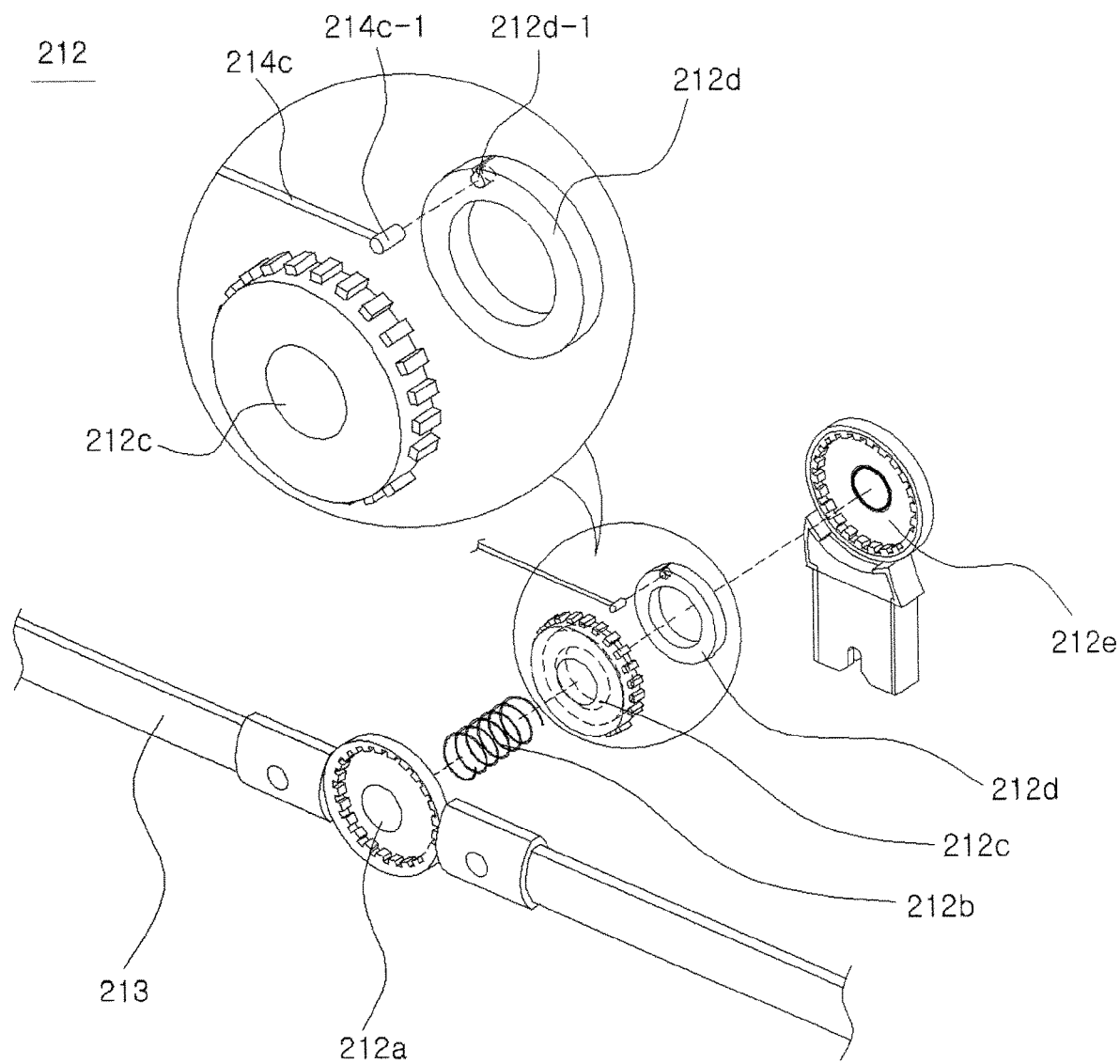
FIG. 8 is an exploded perspective view showing elements constituting the baby carriage rotation control unit according to the present invention, with a partially enlarged view showing the state in which a wire coupling protrusion of an inside connection wire is coupled into a wire coupling protrusion recess formed in a gear rotation frame.

As shown in FIG. 8, the baby carriage rotation control unit includes an outer housing 212a, a compression spring 212b, a rotary gear 212c, a gear rotation frame 212d, and an inner housing 212e.

Here, the outer housing 212a has a disk shape that is erected in the lateral direction. The inner surface of the middle of the outer housing is empty, and a coupling wing for coupling the baby carriage seat main frame is formed in the frontward-rearward direction thereof. The outer surface of the outer housing is coupled to the inside of the baby carriage coupling unit 211, and a gear groove is formed along the inner circumference of the inner surface of the outer housing.

At this time, the compression spring 212b is inserted into the middle of the inner surface of the outer housing so as to be supported, and the outer surface of the rotary gear 212c is detachably coupled to the gear groove formed along the circumference of the inner surface of the outer housing in order to support and fix the rotation of the baby carriage rotation control unit 212.

Here, the compression spring 212b is inserted into the middle of the inside of the outer housing 212a in the leftward-rightward direction, and is inserted between the outer housing 212a and the rotary gear 212c in order to move and return the rotary gear 212c in the leftward-rightward direction according to the leftward-rightward movement and rotation of the gear rotation frame 212d.

Here, the rotary gear 212c has a disk shape that is erected in the lateral direction. The outer circumference of the rotary gear is circular, and gear teeth are formed along the inner circumference of the rotary gear at uniform intervals, and are detachably coupled to the gear groove formed in the inner surface of the outer housing 212a and a gear groove formed in the inner surface of the inner housing 212e in order to support and fix the rotation of the baby carriage rotation control unit 212.

Here, the gear rotation frame 212d is a frame having a circular band shape, the middle of which is open, and is inserted into an inner circular recess of the rotary gear 212c. A wire coupling protrusion recess 212d-1 is formed in one side of the inner surface of the gear rotation frame in order to receive a coupling protrusion 214c-1 of an inner connection wire.

Figure 9:
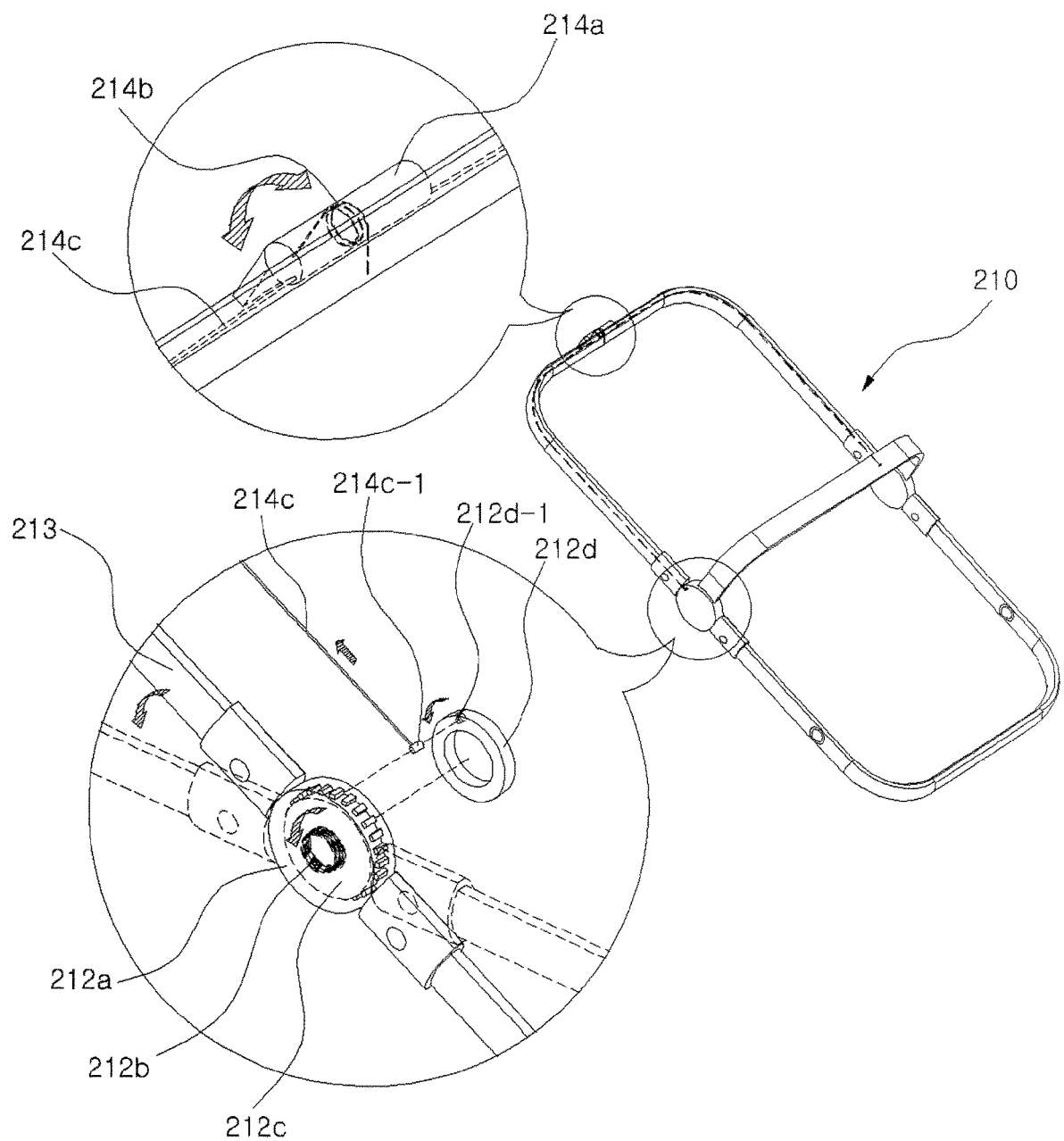
FIG. 9 is a view showing a baby carriage rotation handle unit formed at the baby carriage seat frame according to the present invention, with a view showing an embodiment in which a pulling rotation control handle is pulled in order to rotate the baby carriage rotation control unit and a partially enlarged view showing a portion of the baby carriage rotation handle unit.

In the case in which the inner connection wire 214c is pulled by a pulling rotation control handle 214a, as shown in FIG. 9, the outer surface of the rotary gear 212c is moved in the inward direction, and the gear teeth formed along the inner circumference of the rotary gear are detached from the inner gear recess of the outer housing, whereby the rotation thereof is performed. In the case in which the pulling rotation control handle 214a is returned to the original position thereof by a torsion spring 214b, the outer surface of the rotary gear 212c is returned in the outward direction, and the gear teeth of the rotary gear are inserted into the inner gear recess of the outer housing, whereby the rotation thereof is fixed.

That is, when the pulling rotation control handle is pulled, the inner connection wire is pulled, and the rotary gear, into which the gear rotation frame is inserted, is moved in the inward direction, whereby the rotation thereof is performed, and therefore the baby carriage seat frame 210 is rotated in the axial direction. When the pulling rotation control handle is released, the inner connection wire is released, and the rotary gear, into which the gear rotation frame is inserted, is moved in the outward direction, whereby the rotation thereof is fixed, and therefore the axial rotation of the baby carriage seat frame 210 is fixed.

Here, the inner housing 212e has a disk shape that is erected in the lateral direction. The outer surface of the middle of the inner housing is empty, and a gear groove is formed along the inner circumference of the outer surface of the inner housing. The inner housing is coupled to the outer housing 212a through engagement therewith.

At this time, the gear teeth of the rotary gear 212c are engaged with the gear groove formed along the inner circumference of the outer surface of the inner housing.

The baby carriage seat main frame 213 has a rectangular rim shape in which a frame having a shape formed by connecting the rear ends of two frames in a perpendicular manner so that they extend parallel to each other in the inclined state is coupled to the front surface and the rear surface of the baby carriage rotation control unit in a symmetrical fashion, and serves to support a baby carriage seat.

In the baby carriage rotation handle unit 214, a handle is formed at the middle of the rear surface of the baby carriage seat main frame in the outward direction, and a wire is inserted along the inside of a rear baby carriage seat main frame in order to rotate or fix the baby carriage rotation control unit.

The baby carriage rotation handle unit includes a pulling rotation control handle 214a, a torsion spring 214b, and an inner connection wire 214c.

Here, the pulling rotation control handle 214a has a rotary handle shape formed at the middle of the rear surface of the baby carriage seat main frame, and the left and right ends thereof are coupled to the rotary shaft.

At this time, when the pulling rotation control handle is pulled, the inner connection wire, which is coupled to the inside thereof in the leftward-rightward direction, is pulled, and the gear rotation frame 212d and the rotary gear 212c, into which the coupling protrusion 214c-1 formed at the end thereof is inserted, are detached from the inner gear recess of the outer housing 212a, whereby rotation thereof is performed. When the pulling rotation control handle is released, the pulling rotation control handle is returned to the original position thereof by the torsion spring 214b, and the pulled inner connection wire is released, whereby the gear rotation frame and the rotary gear 212c are returned to the original positions thereof, and the gear teeth of the rotary gear 212c are coupled to the inner rear recess of the outer housing, whereby the rotation thereof is fixed.

Here, one side of the torsion spring 214b is connected to the inside of the middle of the rear surface of the baby carriage seat main frame, and the other side of the torsion spring is connected to the inside of the pulling rotation control handle in order to generate the rotary restoring force of the pulling rotation control handle.

Here, the inner connection wire 214c is connected to the inside of each of the left and right sides of the pulling rotation control handle, and the coupling protrusion 214c-1, which is formed at the end of the inner connection wire, is inserted into the wire coupling protrusion recess 212d-1 of the gear rotation frame, whereby pulling and release are performed through the rotation of the pulling rotation control handle.

The canopy frame 215 includes a plurality of frames, each of which is coupled to one side of the rear of the side surface of the baby carriage coupling unit in a symmetrical fashion and each of which has a shape formed by connecting the rear ends of two frames in a perpendicular manner so that they extend parallel to each other in the inclined state. The canopy frame can be rotated in either the upward or downward direction to be unfolded into a fan shape or to be folded at the upper end of the baby carriage seat frame.

The canopy frame 215 according to the present invention optionally includes one of an upper-end cover canopy 215a and a dome-shaped canopy 215b.

The upper-end cover canopy 215a includes a plurality of frames, each of which has a shape formed by connecting the rear ends of two frames in a perpendicular manner so that they extend parallel to each other in the inclined state. The frames are rotated in the three axial directions based on the side surface thereof in order to set the angle of a canopy. The upper-end cover canopy serves to support a baby carriage canopy sheet covering the upper end of the single baby carriage frame.

Figure 13:
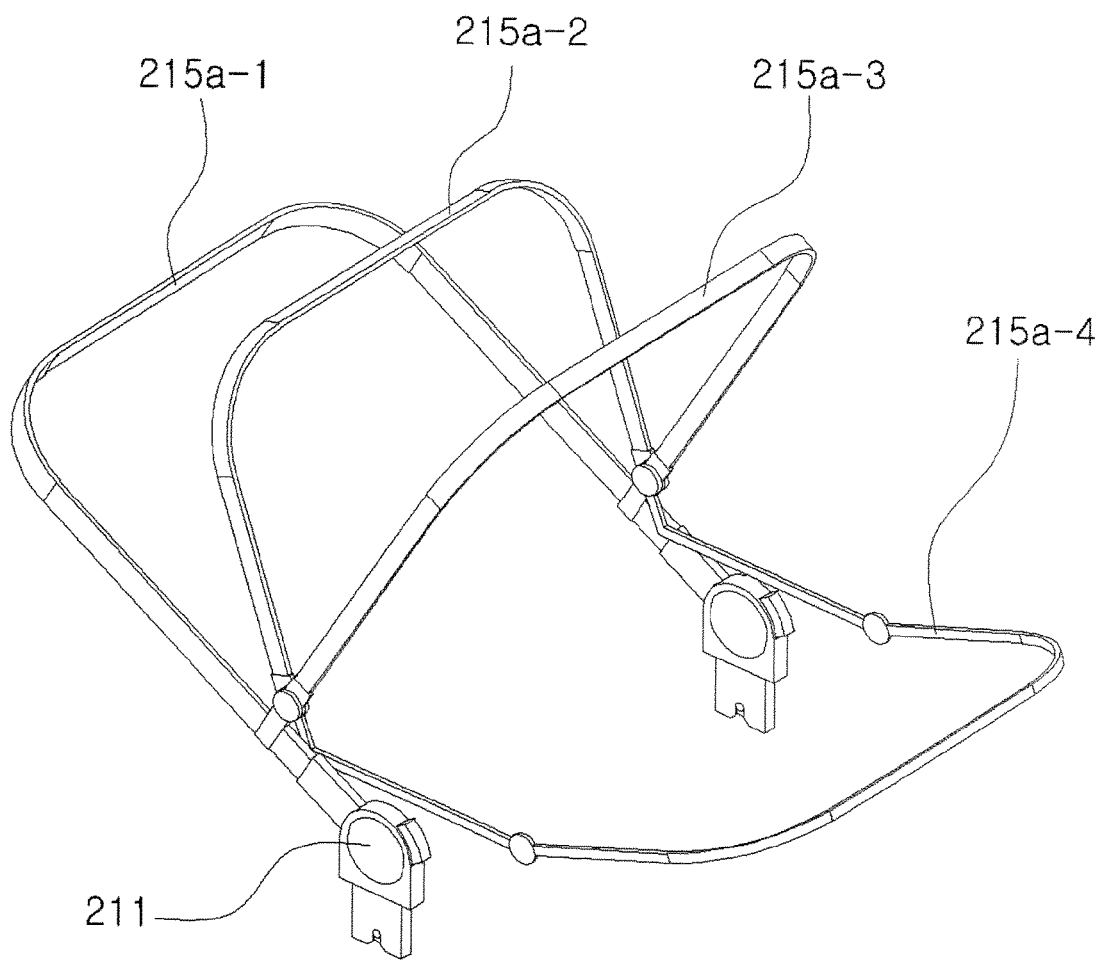
FIG. 13 is a perspective view showing elements constituting the upper-end cover canopy according to the present invention.
Figure 14:
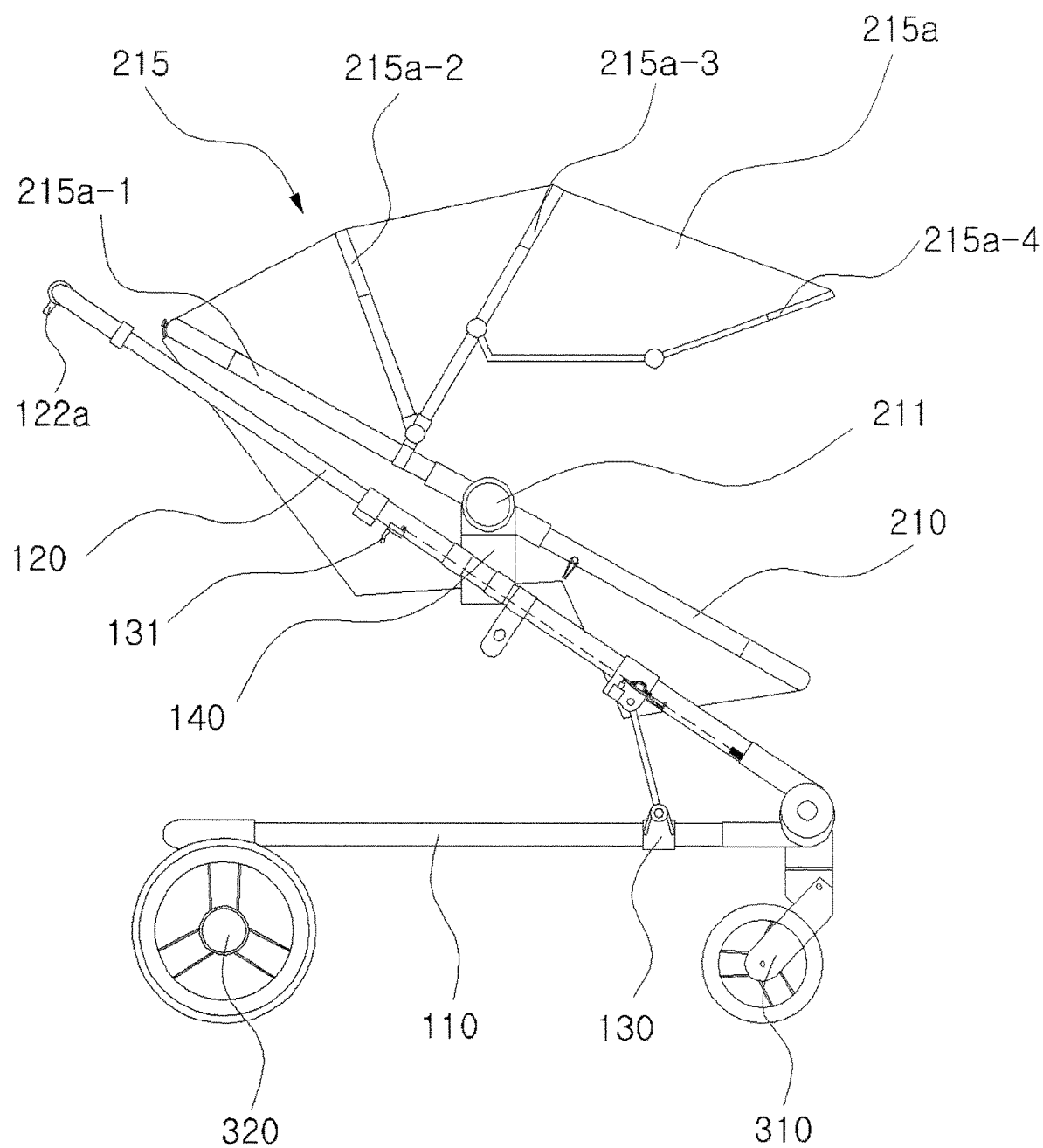
FIG. 14 is a side view showing the single baby carriage frame, to which the upper-end cover canopy according to the present invention is coupled and to which the baby carriage seat frame is coupled.

Here, as shown in FIG. 13, the upper-end cover canopy 215a is configured to have a structure in which the first canopy frame 215a-1, which has a shape formed by connecting the rear ends of two frames in a perpendicular manner so that they extend parallel to each other in the inclined state, are coupled to the rear of the side surface of the baby carriage coupling unit through a first rotary shaft. A second canopy frame 215a-2, a third canopy frame 215a-3, and a fourth canopy frame 215a-4 can be added, each of which are connected in perpendicular manner so that they extend parallel to each other in the inclined state. Each of them can be sequentially disposed. Further, a second rotary shaft is formed at one side of the lower end of the first canopy frame in the leftward-rightward direction, and a third rotary shaft is formed at one side of the fourth canopy frame in the leftward-rightward direction such that one side of the front of the fourth canopy frame can be rotated.

The first canopy frame 215a-1, the second canopy frame 215a-2, the third canopy frame 215a-3, and the fourth canopy frame 215a-4 are sequentially coupled to each other in the inward direction, and are rotated about the first, second, and third rotary shafts in order to easily change the folding and unfolding angles and the shape of the upper-end cover canopy 215a through the cooperative rotations thereof.

The dome-shaped canopy 215b includes a plurality of frames, each of which has a shape formed by connecting the outer ends of two frames in a perpendicular manner so that they extend parallel to each other in the inclined state. The dome-shaped canopy can be unfolded in a fan shape so as to be coupled to the upper end of the front and the upper end of the rear of the baby carriage coupling unit 211 in a symmetrical fashion, and the dome-shaped canopy parts are detachably coupled to each other along the middle circumferences thereof that contact each other using a zipper so as to have a dome shape. The dome-shaped canopy serves to support a baby carriage canopy sheet covering the entire upper end surface of the single baby carriage frame.

Figure 15:
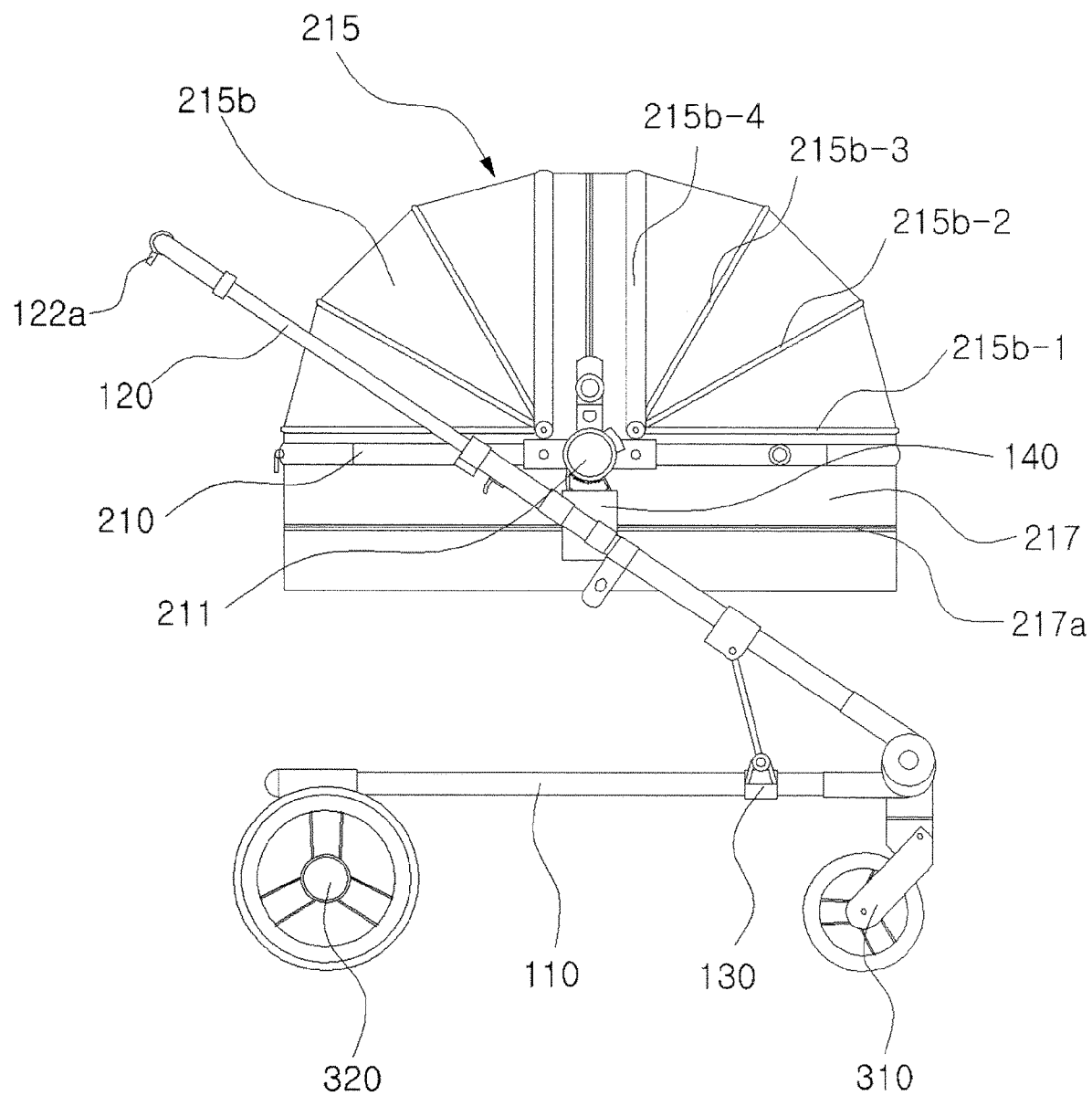
FIG. 15 is a side view showing the state in which a dome-shaped canopy according to the present invention is coupled and in which the baby carriage seat having a baby carriage seat height adjustment zipper, which is in a closed state, is coupled to the lower end of the baby carriage seat frame.

As shown in FIG. 15, the dome-shaped canopy 215b is configured to have a structure in which the first canopy frame 215b-1, which is formed by connecting the rear ends of two frames in a perpendicular manner so that they extend parallel to each other in the inclined state, is coupled to the upper end of each of the front and the rear of the baby carriage coupling unit so as to contact the baby carriage seat main frame 213, and a second canopy frame 215b-2, a third canopy frame 215b-3, and a fourth canopy frame 215b-4, which are sequentially coupled to the first canopy frame in the upper-end direction at uniform intervals, are provided in the forward-rearward direction in a symmetrical fashion, and the front fourth canopy frame and the rear fourth canopy frame are coupled along the circumferences thereof using a zipper.

The dome-shaped canopy 215b according to the present invention is made of a mesh material. When a companion animal is carried, therefore, the companion animal may smoothly breathe, and it is possible to prevent the companion animal from escaping the dome-shaped canopy and falling into an open space.

In addition, when the dome-shaped canopy 215b is installed, a baby carriage seat 217, the length of which is adjustable in the vertical direction, may be coupled to the lower end of the baby carriage seat main frame in a rectangular shape such that the baby carriage seat can be used.

Figure 16:
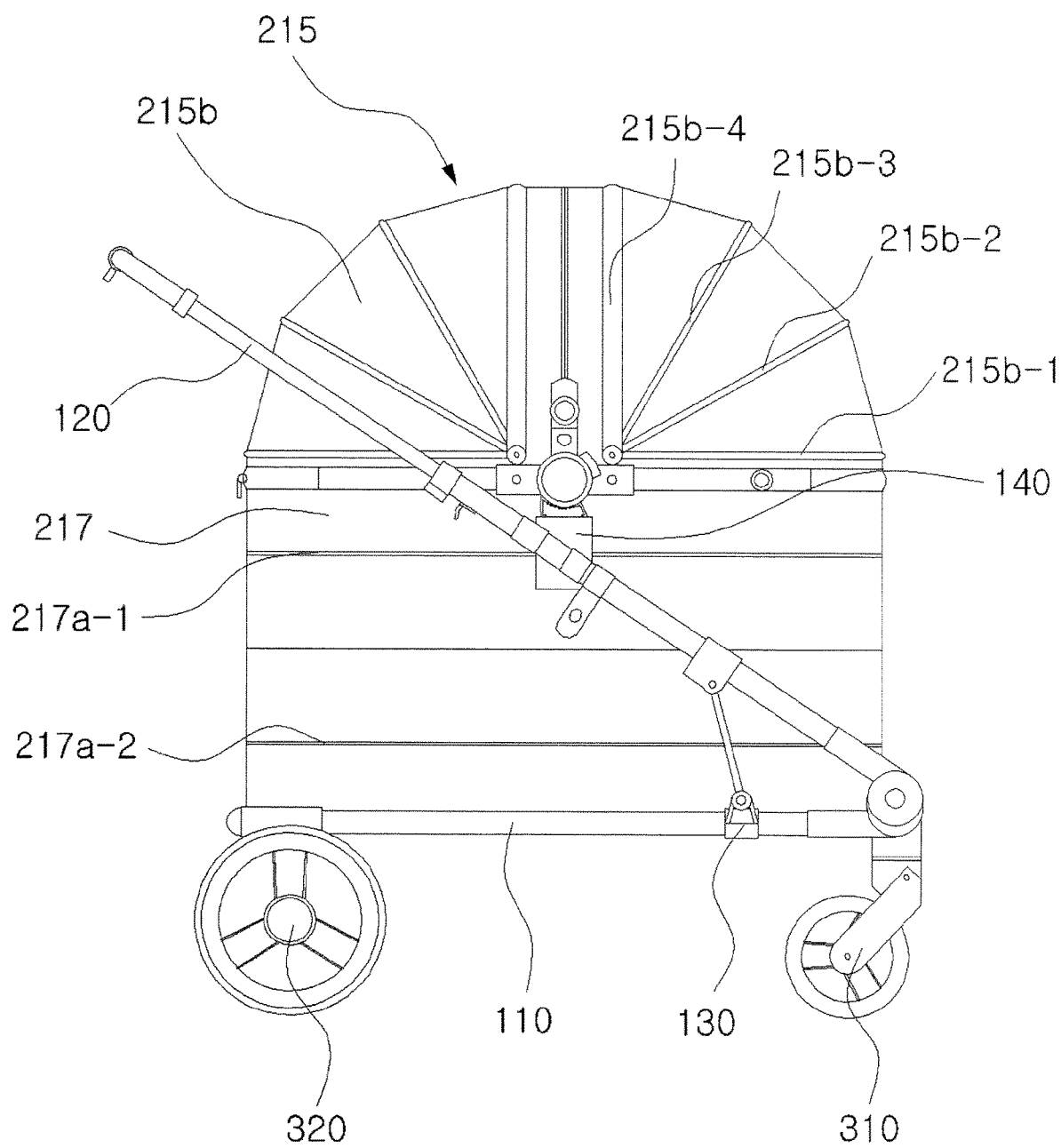
FIG. 16 is a side view showing the state in which dome-shaped canopy according to the present invention is coupled and in which the baby carriage seat having the baby carriage seat height adjustment zipper, which is in an open state, is coupled to the lower end of the baby carriage seat frame.
Figure 17:
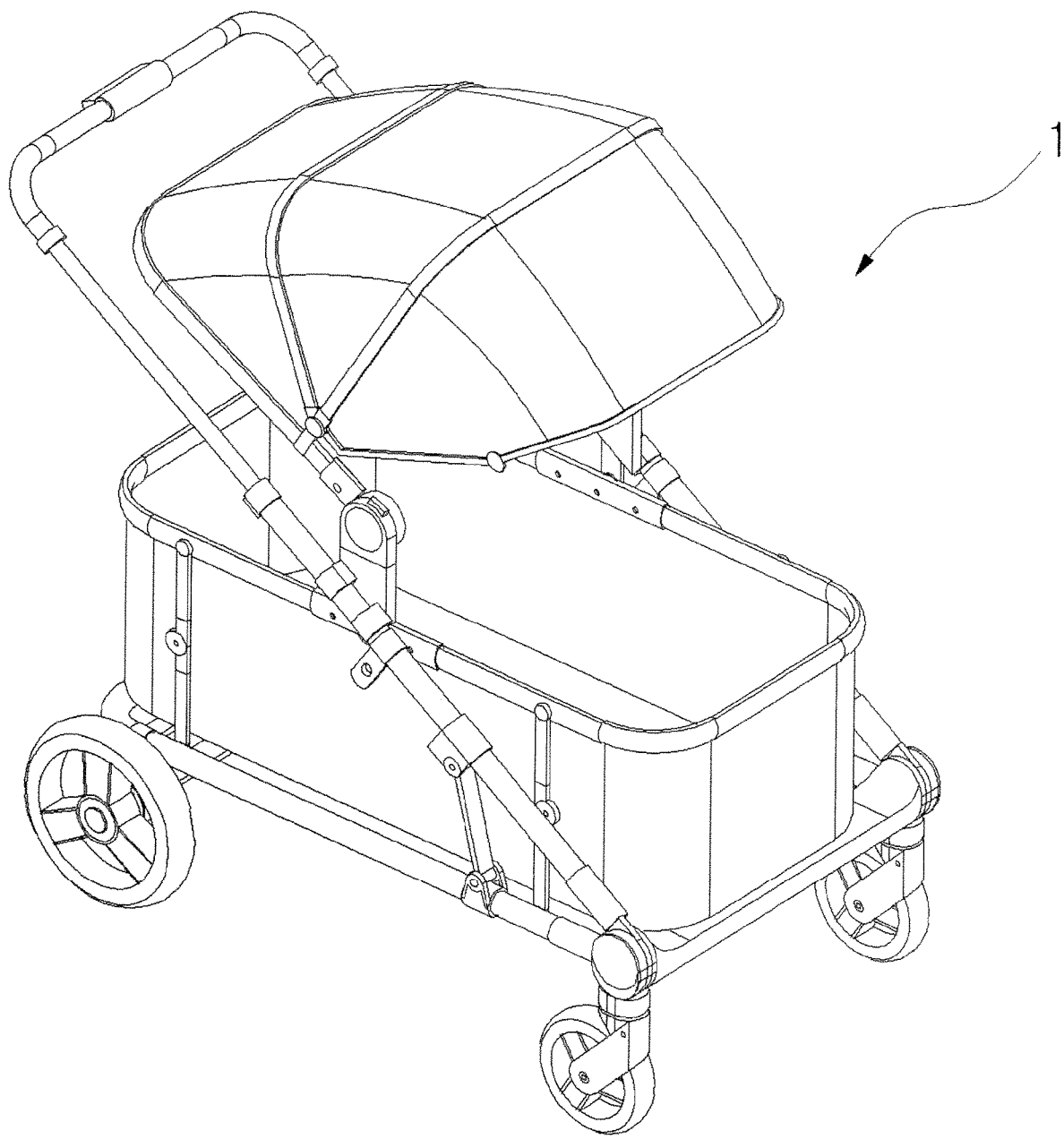
FIG. 17 is a perspective view showing the overall shape of the single baby carriage frame, to which a wagon seat frame is coupled and at which a wagon seat is installed in the baby carriage having improved convenience of use.
Figure 18:
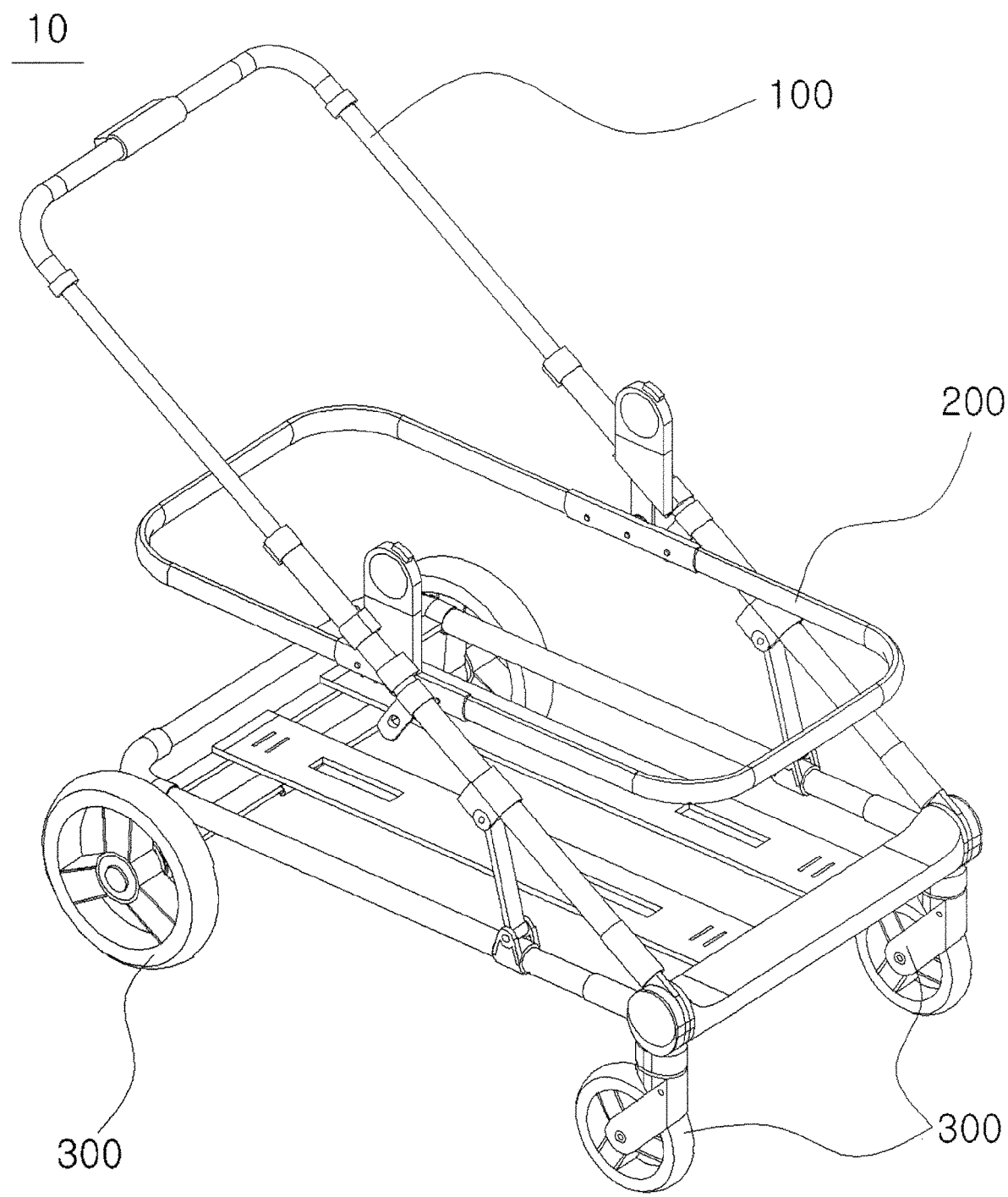
FIG. 18 is a perspective view showing the overall shape in which the wagon seat frame is coupled to the single baby carriage frame according to the present invention.
Figure 19:
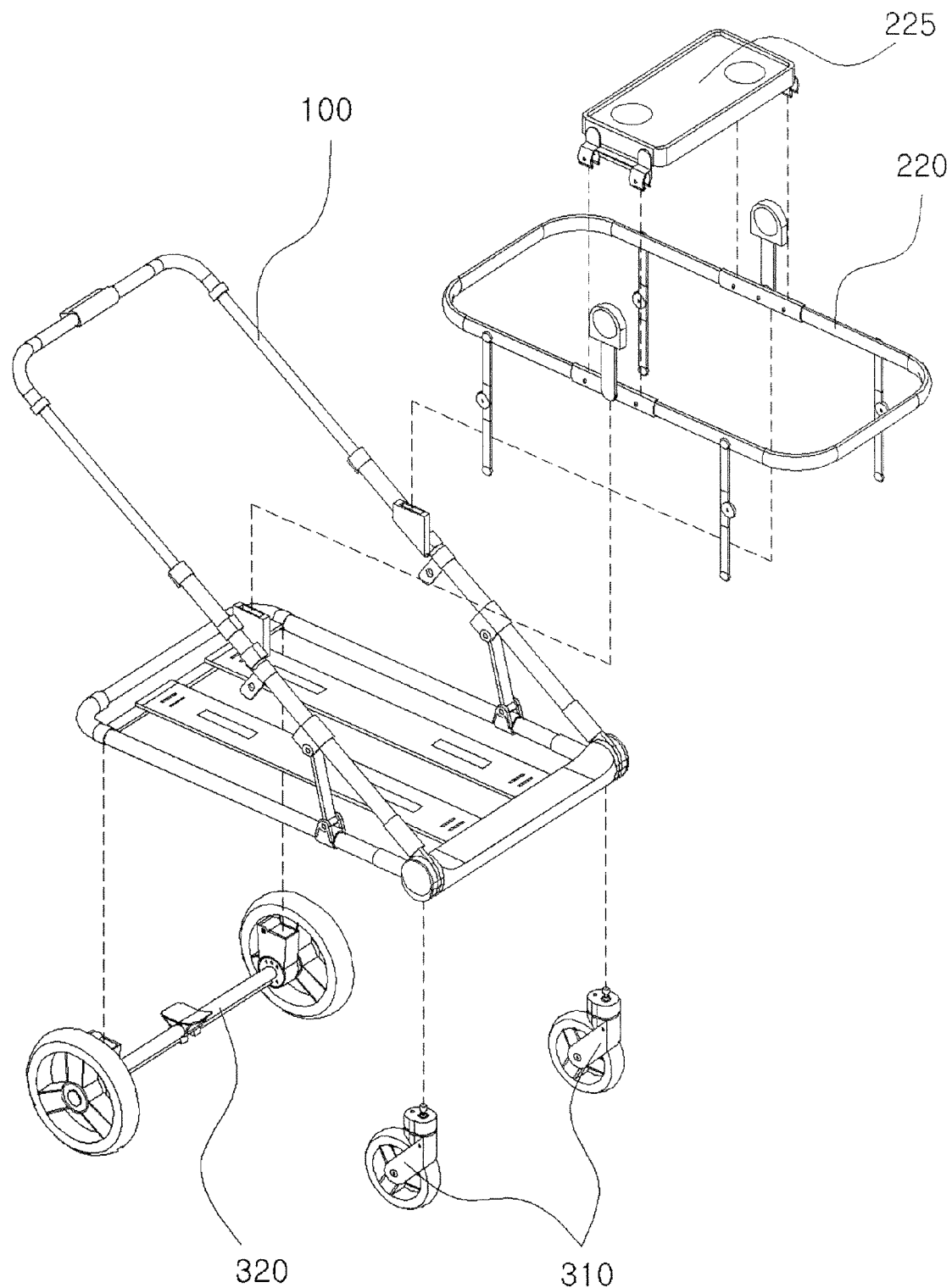
FIG. 19 is an exploded perspective view showing the elements constituting the single baby carriage frame, to which the wagon seat frame according to the present invention is coupled.

At this time, the baby carriage seat 217 may be adjusted depending on the size of the companion animal. When a small companion animal is carried, as shown in FIG. 15, a baby carriage seat height adjustment zipper 217a, formed along the middle circumference of the baby carriage seat 217, may be closed in order to decrease the inner depth of the baby carriage seat 217. When a large companion animal is carried, as shown in FIG. 16, the baby carriage seat height adjustment zipper 217a, formed along the middle circumference of the baby carriage seat 217, may be opened in order to spread the seat folded between a zipper upper end 217a-1 and a zipper lower end 217a-2 and thus to increase the inner depth of the baby carriage seat 217.

Consequently, it is possible to carry the companion animal as well as the children and to allow the companion animal to look outside through the mesh, whereby it is possible to go out with mental comfort.

The wagon seat frame 220 has a rectangular rim shape, and is coupled to the wagon seat coupling bar 143, which protrudes from the lower end of the side inclination bracket. The left and right sides of the front and the rear of the wagon seat frame are fixed in symmetrical fashion, and the wagon seat frame is erected in the lower-end direction so as to be coupled to the support frame and to support a wagon seat in the horizontal direction.

The wagon seat frame includes a wagon coupling unit 221, a wagon seat main frame 222, a wagon auxiliary frame 223, and a canopy frame 224.

The wagon coupling unit 221 is a rectangular frame, the left and right side surfaces of which are convex. Protruding pins are formed at the front, the middle, and the rear of one side surface of the frame in a symmetrical fashion. The wagon coupling unit is fixed to the middle of the lower end of the wagon seat coupling bar 143 of the side inclination bracket in a symmetrical fashion in order to fix the wagon seat frame.

Figure 20:
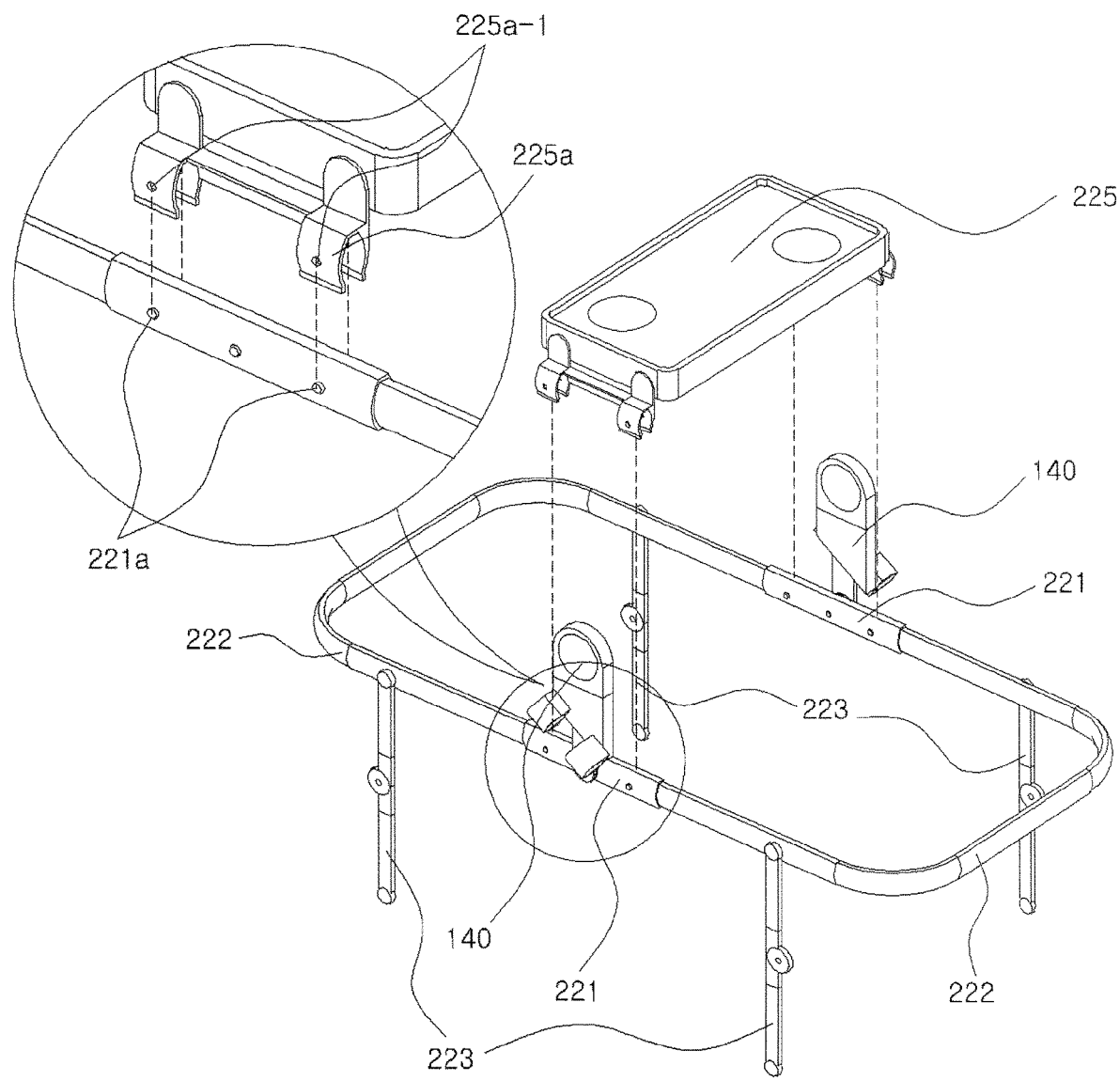
FIG. 20 is a view showing elements constituting the wagon seat frame according to the present invention, with a view showing the state in which a tray is coupled to the upper end of the wagon seat frame and a partially enlarged view showing the portion of the wagon seat frame to which the tray is coupled.

As shown in FIG. 20, the protruding pins 221a, formed at the front and the rear of one side surface in a symmetrical fashion, are fitted into fitting recesses 225a-1 formed in a fitting coupling unit 225a, which protrudes toward the lower ends of the left and right side surfaces of a tray, in order to fix the tray 225.

At this time, the protruding pins 221a, formed at the front and the rear of one side surface in a symmetrical fashion, are fitted into the fitting recesses 225a-1, whereby the forward-rearward movement of the tray 225, which is coupled through the fitting of the fitting coupling unit, is prevented and the tray is stably supported.

The wagon seat main frame 222 has a rectangular rim shape that is formed by connecting the rear ends of two frames in a perpendicular manner so that they extend parallel to each other in the inclined state. The frame is coupled to the front surface and the rear surface of the wagon coupling unit in a symmetrical fashion, and serves to support the wagon seat.

The wagon auxiliary frame 223 is located at the lower ends of the left and right sides of the front and rear of the wagon seat main frame in a symmetrical fashion, is erected in the lower-end direction. The wagon auxiliary frame is a bar-shaped frame having a rotary shaft formed at the middle thereof. The lower end of the wagon auxiliary frame is coupled to the left and right sides of the front and the rear of the support frame in a symmetrical fashion.

Figure 21:
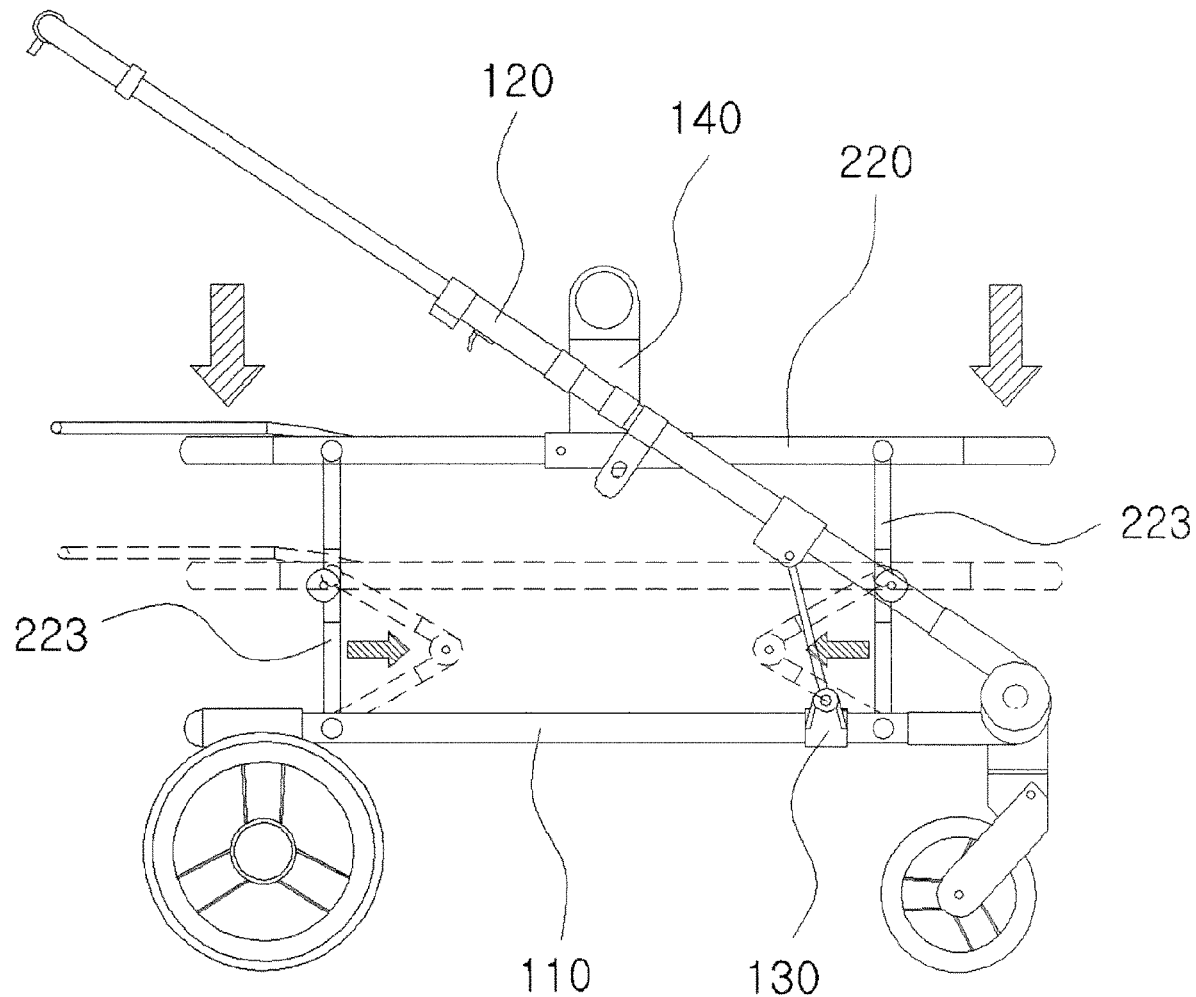
FIG. 21 is a view showing an embodiment in which a wagon auxiliary frame, coupled to the front and rear sides of the wagon seat frame according to the present invention, is folded about a central axis, whereby the wagon seat frame is folded.

As shown in FIG. 21, the wagon auxiliary frame located at the left and right sides of the front is rotated about the rotary shaft formed at the middle thereof and folded rearwards, and the wagon auxiliary frame located at the left and right sides of the rear is rotated about the rotary shaft formed at the middle thereof and folded forwards.

When the side inclination frame 120 is rotated in the upper-end direction and unfolded, therefore, the middle rotary shaft of the upper-end direction is rotated, whereby the wagon auxiliary frame 223 is unfolded vertically in order to auxiliary support the left and right sides of the front and the rear of the wagon seat frame 220, which is formed horizontally. When the side inclination frame is rotated in the lower-end direction and folded, the middle rotary shaft of the upper-end direction is rotated, whereby the upper end and the lower end of the wagon auxiliary frame are folded horizontally and thus the wagon seat frame is unfolded horizontally in the lower-end direction. Consequently, the volume of the wagon seat frame may be minimized.

The canopy frame 224 includes a plurality of frames, each of which has a shape formed by connecting outer ends of two frames in a perpendicular manner so that they extend parallel to each other, and is rotated in the three axial directions based on the side surface thereof in order to set the angle of the canopy. The canopy frame serves to support a wagon canopy sheet covering the upper end of the single baby carriage frame.

Figure 22:
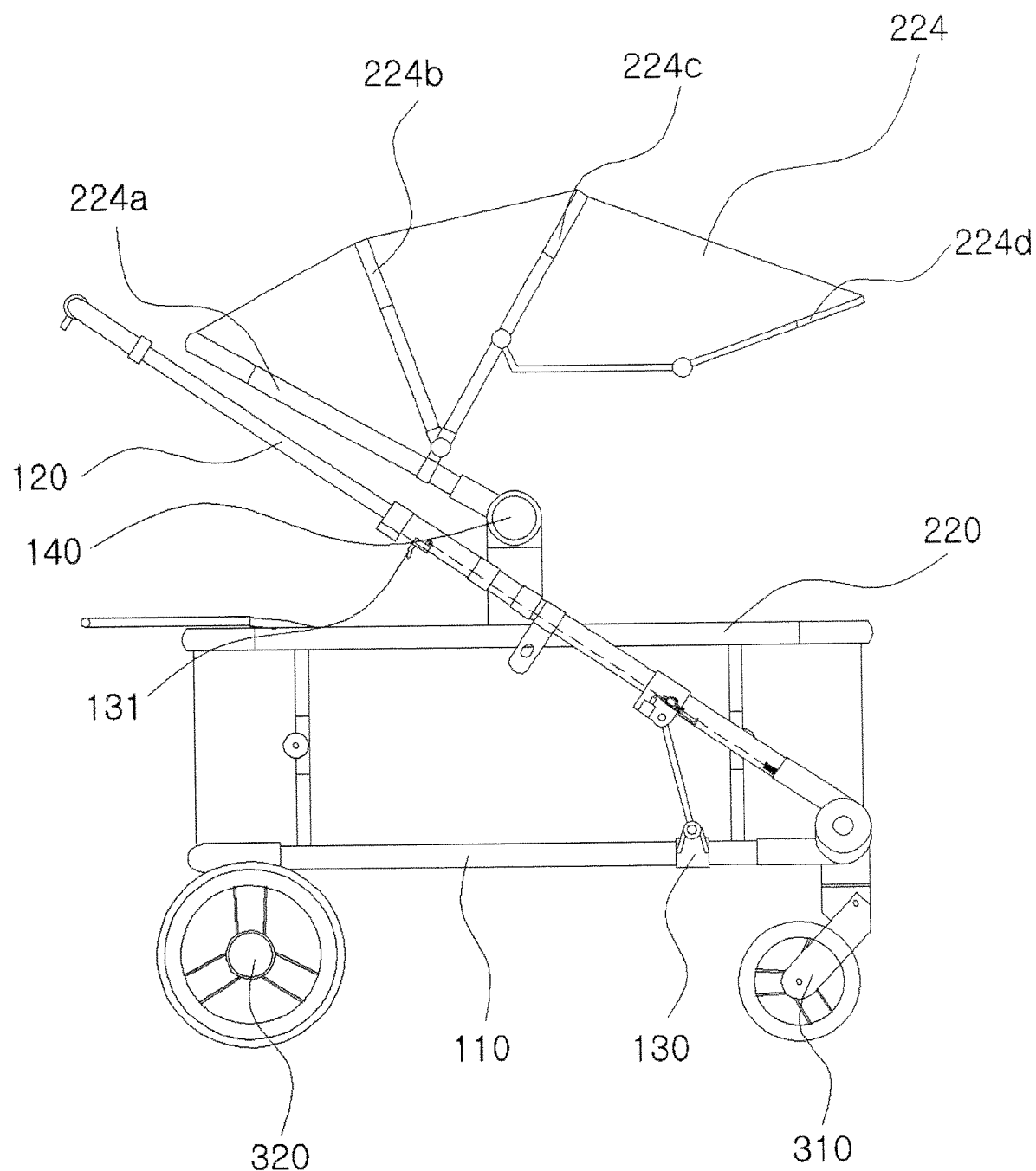
FIG. 22 is a side view showing the single baby carriage frame, to which the upper-end cover canopy according to the present invention is coupled and to which the wagon seat frame is coupled.
Figure 23:
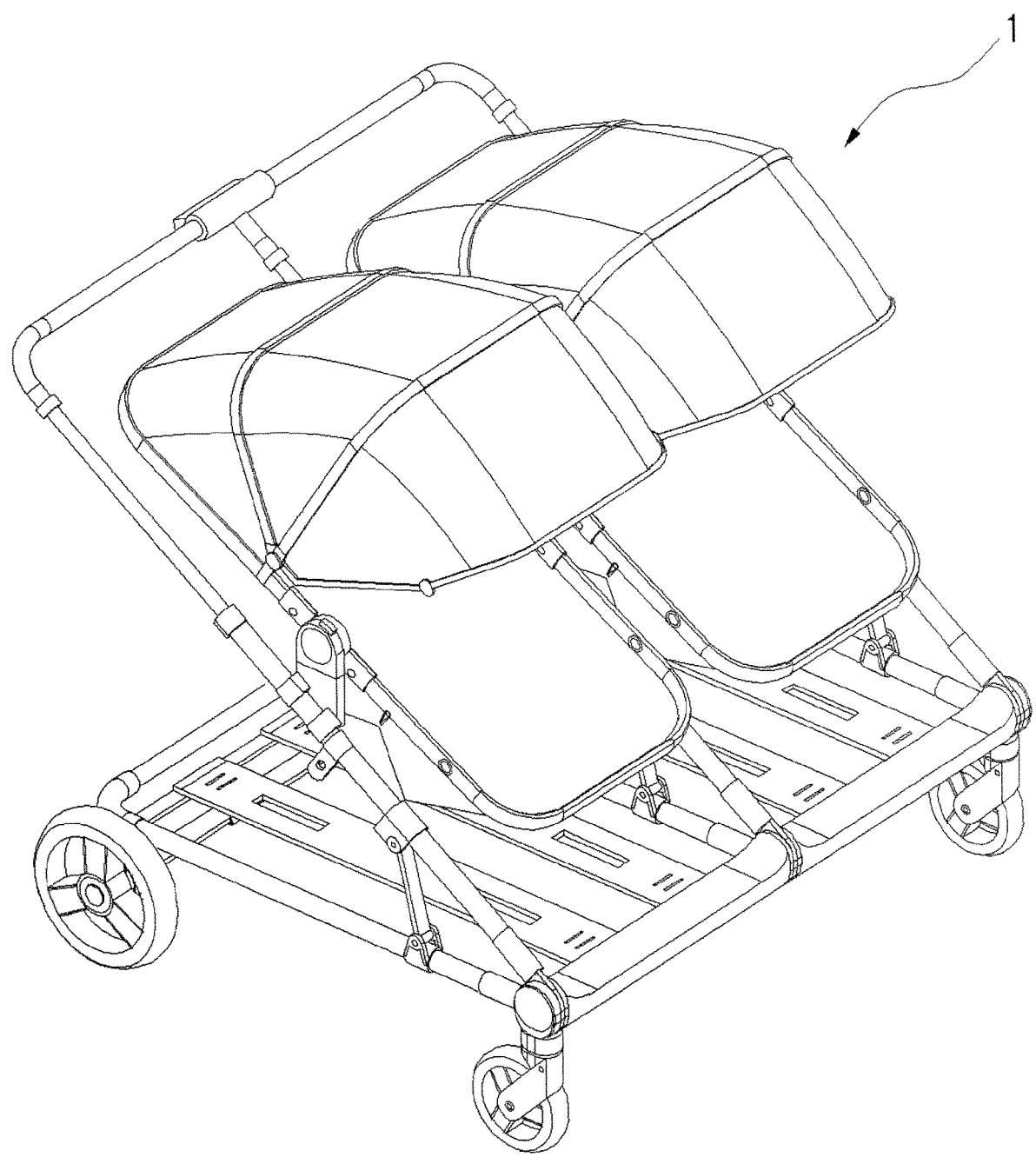
FIG. 23 is a perspective view showing the overall shape of a twin baby carriage frame configured to have a structure in which baby carriage seat frames are coupled to the left and right sides of a second main frame in the baby carriage having improved convenience of use according to the present invention.
Figure 24:
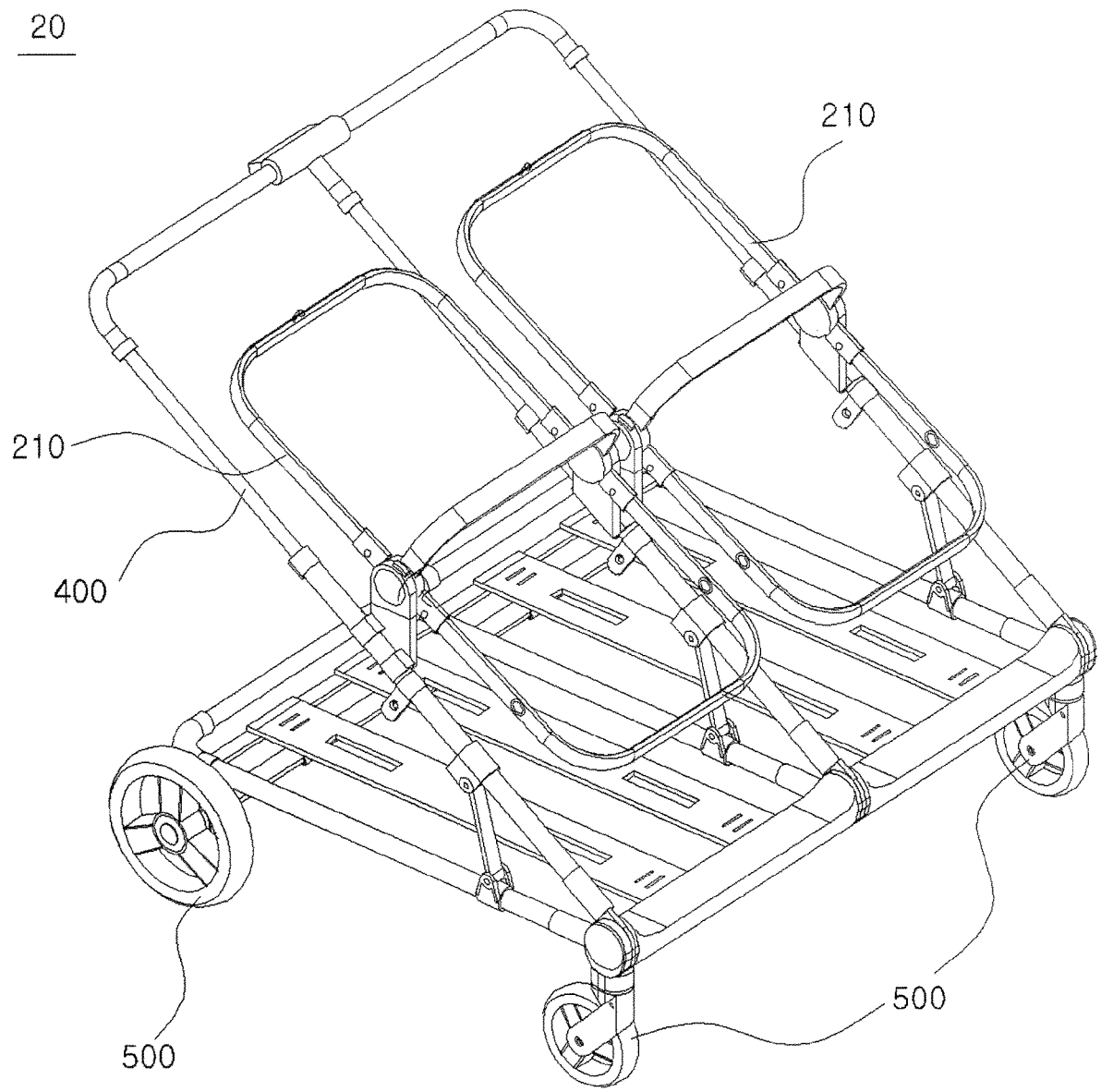
FIG. 24 is a perspective view showing the overall shape in which the baby carriage seat frames are coupled to the twin baby carriage frame according to the present invention.
Figure 25:
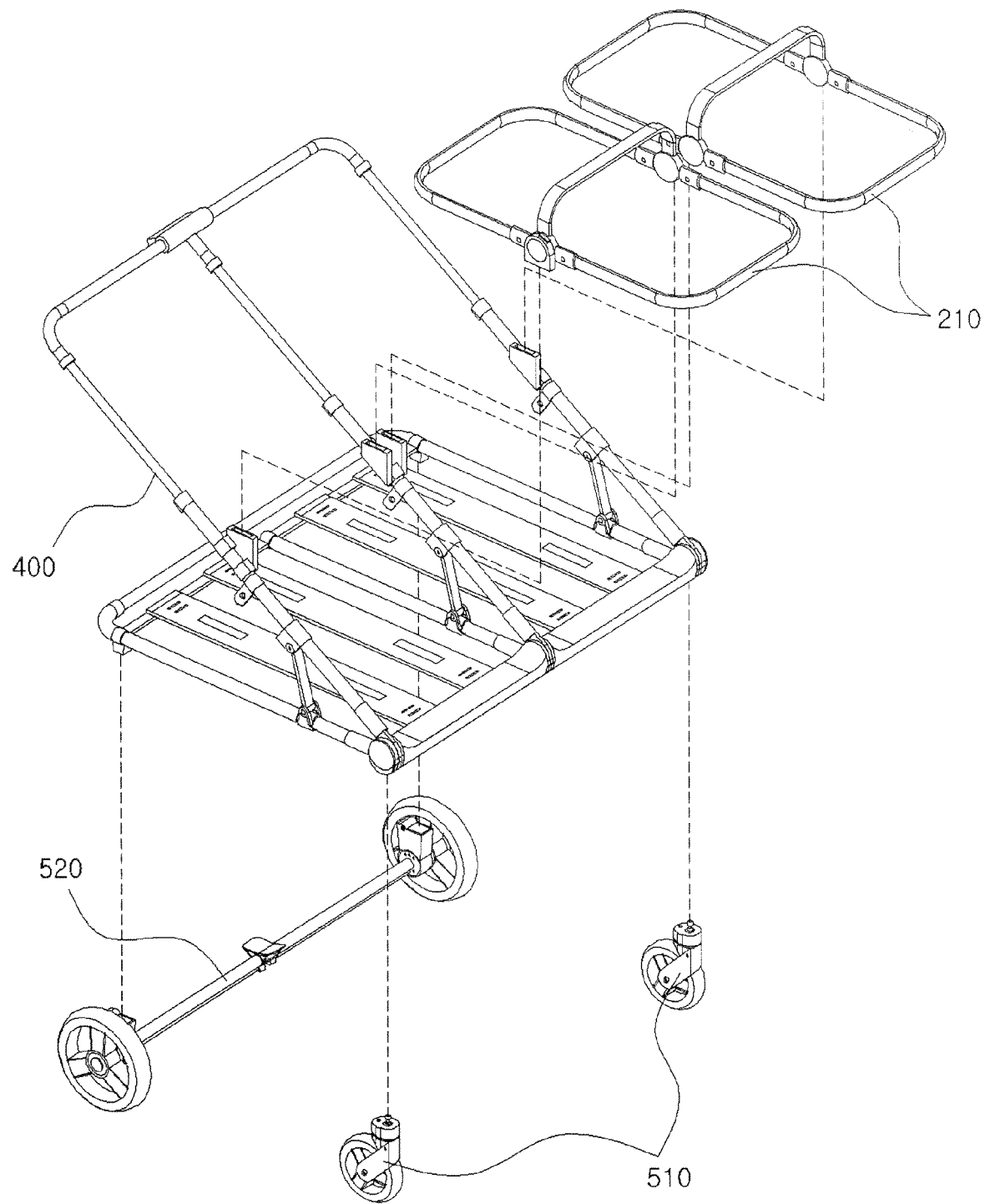
FIG. 25 is an exploded perspective view showing elements constituting the twin baby carriage frame, to which the baby carriage seat frames according to the present invention are coupled.
Figure 26:
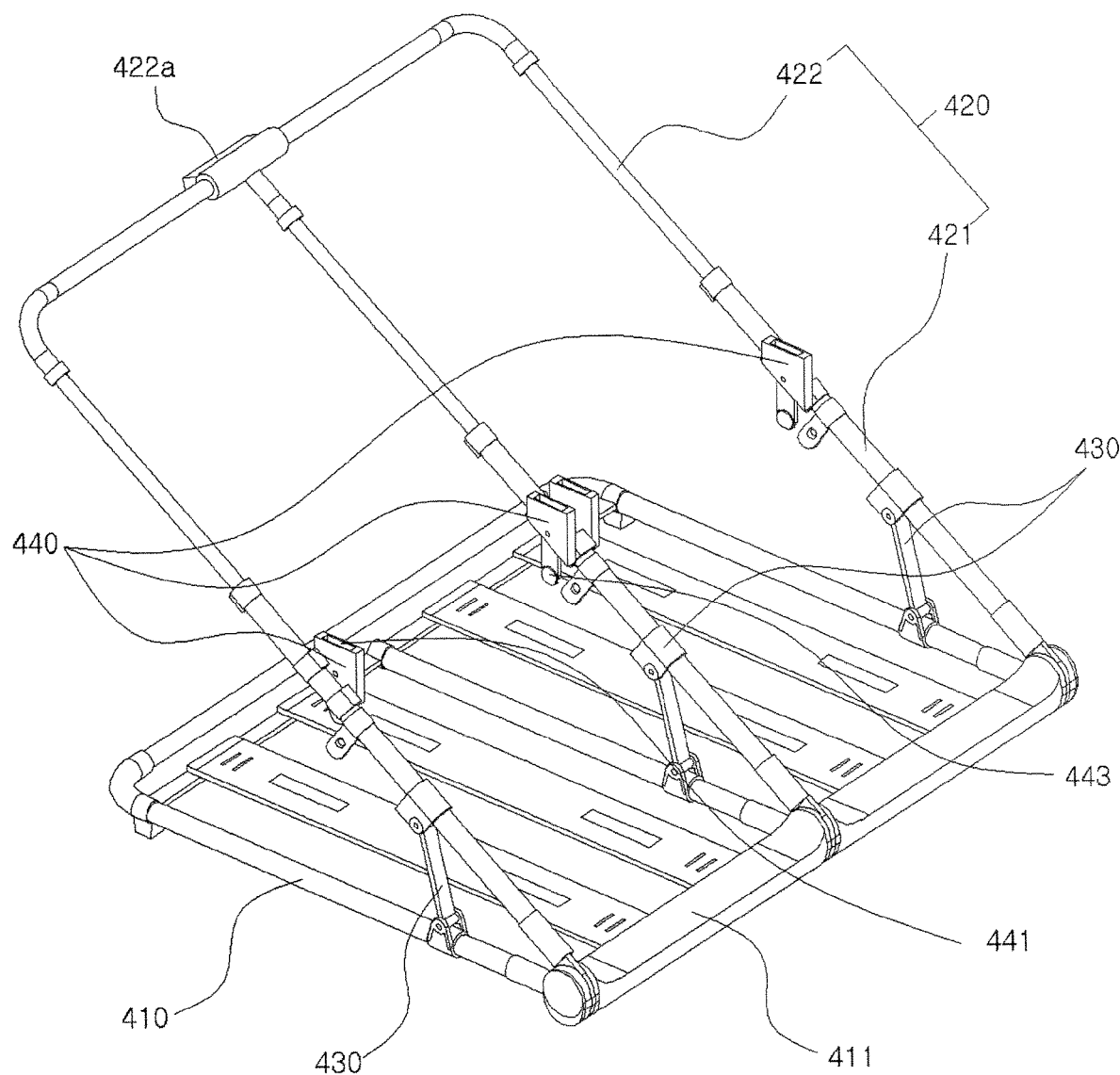
FIG. 26 is a perspective view showing elements constituting the second main frame according to the present invention.
Figure 27:
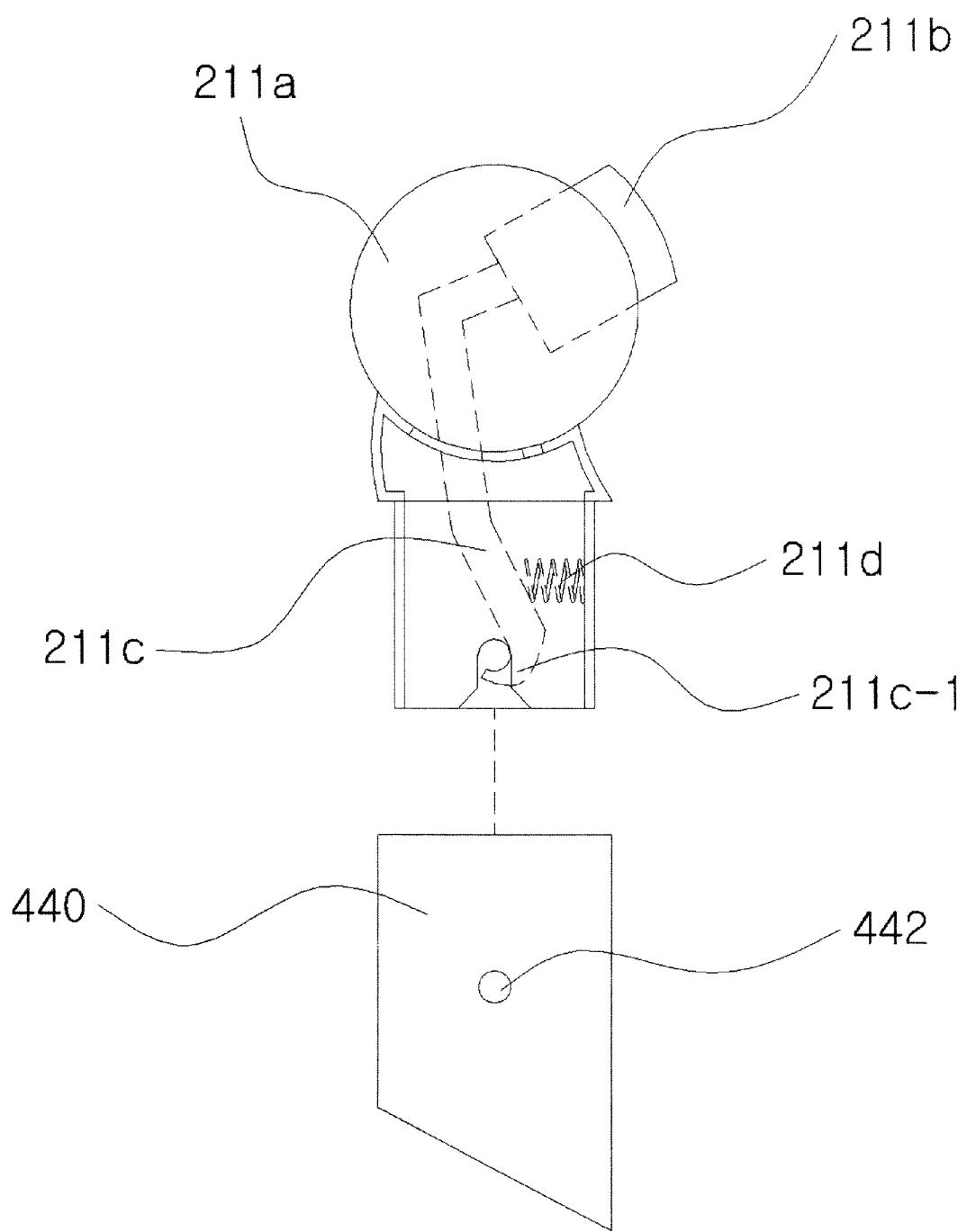
FIG. 27 is a side see-through view showing internal elements constituting a baby carriage coupling unit according to the present invention, with a side see-through view showing an embodiment coupled to a side inclination bracket.
Figure 28:
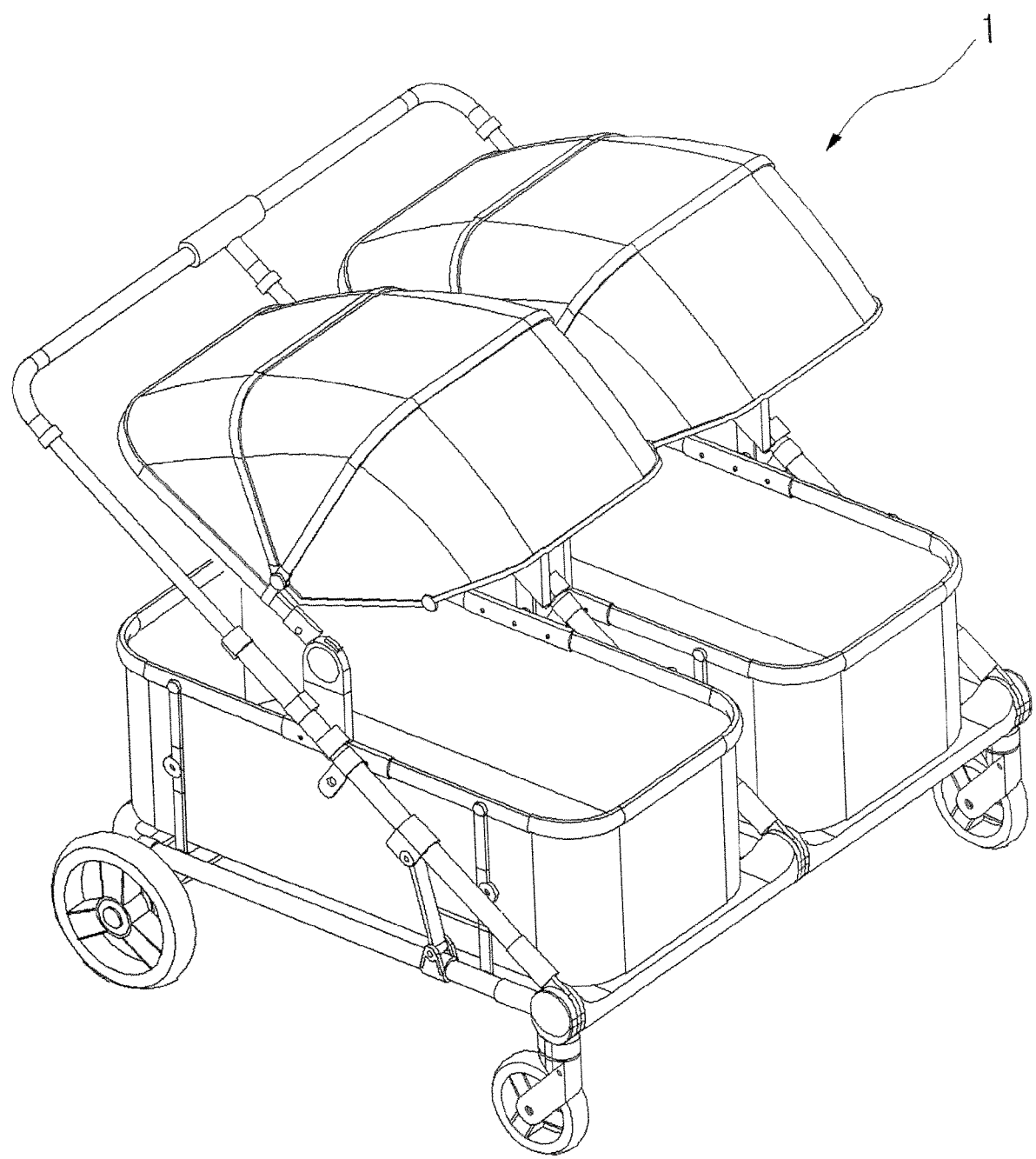
FIG. 28 is a perspective view showing the overall shape of a twin baby carriage frame configured to have a structure in which wagon seat frames are coupled to the left and right sides of the second main frame in the baby carriage having improved convenience of use according to the present invention.
Figure 29:
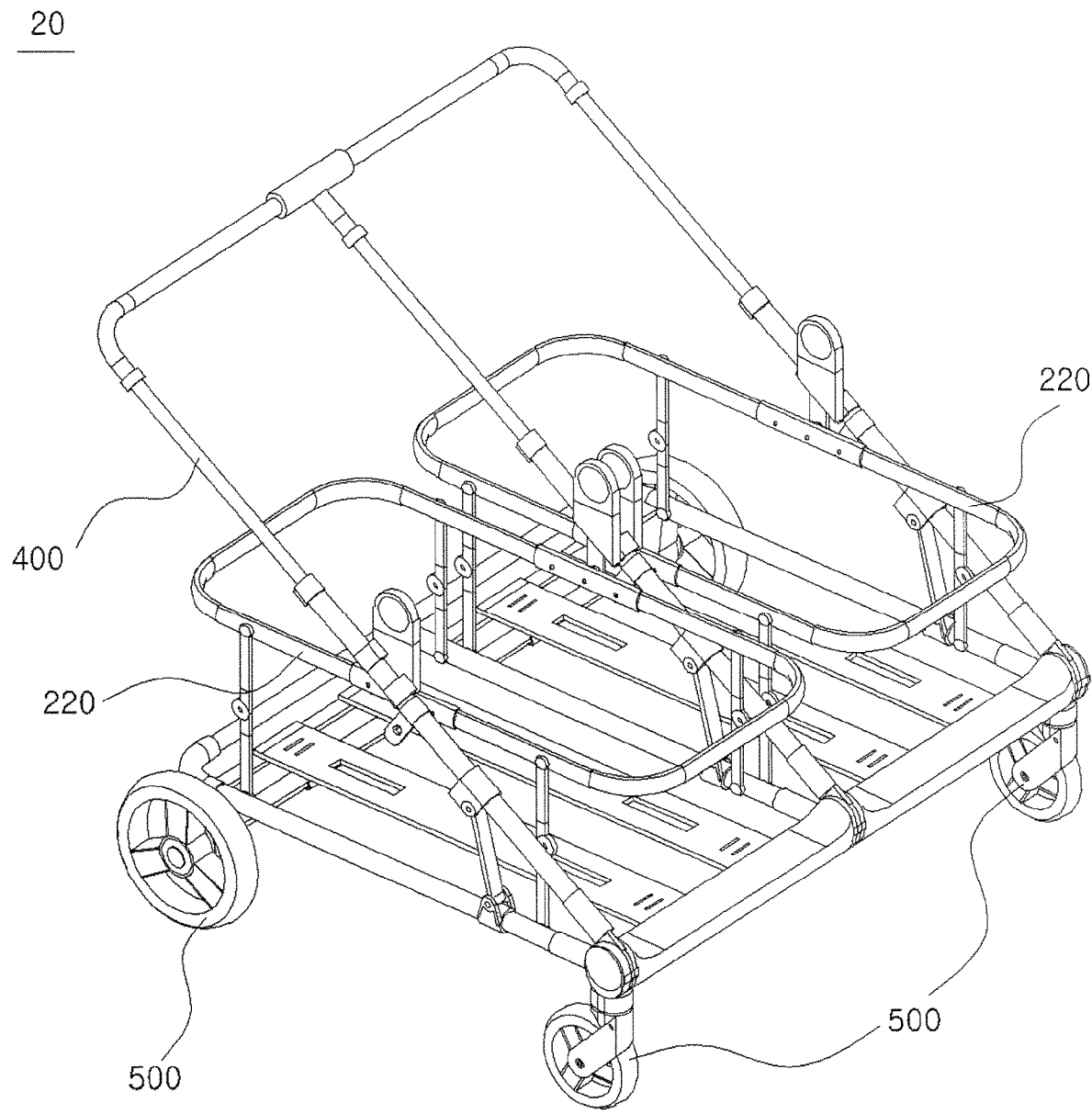
FIG. 29 is a perspective view showing the overall shape in which the wagon seat frames are coupled to the twin baby carriage frame according to the present invention.
Figure 30:
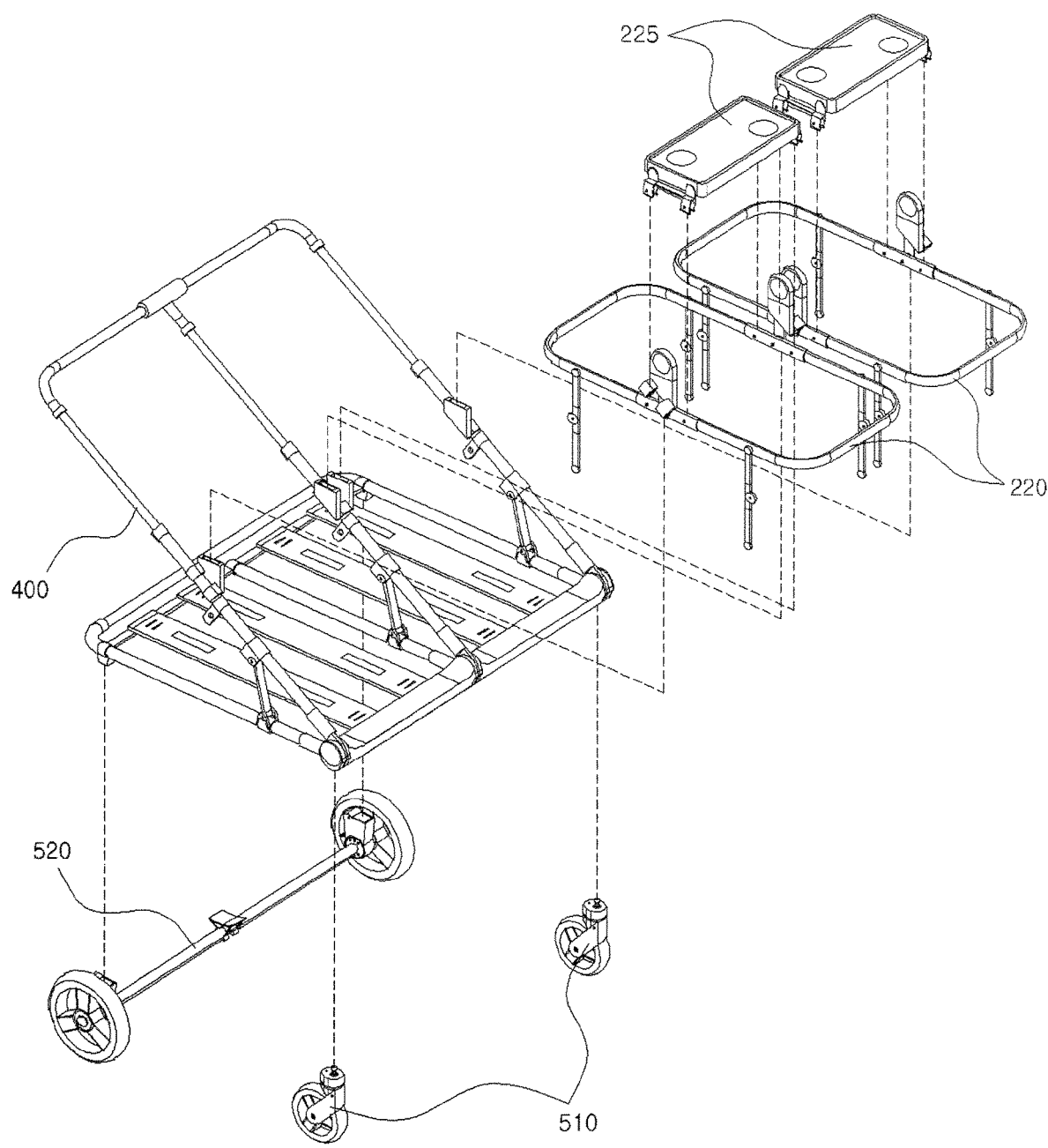
FIG. 30 is an exploded perspective view showing elements constituting the twin baby carriage frame, to which the wagon seat frames according to the present invention are coupled.

Here, as shown in FIG. 22, the canopy frame 224 is configured to have a structure in which a first canopy frame 224a, which has a shape formed by connecting outer ends of two frames in a perpendicular manner so that they extend parallel to each other, is coupled to the rear of the side surface of the baby carriage coupling unit through the first rotary shaft. A second canopy frame 224b and a third canopy frame 224c are connected to a second rotary shaft disposed at one side of the lower end of the first canopy frame in the leftward-rightward direction. A fourth canopy frame 224d is connected to a third rotary shaft disposed at a middle of the third canopy frame, and further the fourth canopy frame may have a fourth rotary shaft disposed in the middle thereof such that it is further configured to be folded at the middle thereof.

The first canopy frame 224a, the second canopy frame 224b, the third canopy frame 224c, and the fourth canopy frame 224d are sequentially coupled to each other in the inward direction, and are rotated about the first, second, and third rotary shafts in order to easily change the folding and unfolding angles and the shape of the canopy frame 224 through the cooperative rotations thereof.

The wheel unit 300 is constituted by driving wheels coupled to the left and right sides of the front surface and the rear surface of the support frame in a symmetrical fashion in order to drive the baby carriage.

The wheel unit includes a front wheel driving unit 310 and a rear wheel driving unit 320.

The front wheel driving unit 310 is coupled to the left and right ends of the lower end of the front of the support frame in a symmetrical fashion. A front wheel detachment switch, which protrudes in a push fashion in order to decouple front wheels, is formed on the side surface of the upper end of the front wheel driving unit. The front wheel driving unit supports the lower end of the front surface of a child wagon and provides power to move the child wagon.

The rear wheel driving unit 320 is coupled to the left and right ends of the lower end of the front of the support frame in a symmetrical fashion. A brake middle shaft, which has a bar shape, is horizontally coupled to the inner central axes of rear wheels formed at the left and right sides in a symmetrical fashion, a brake pad is coupled to the middle of the brake middle shaft, and a brake rotation shaft, which has a bar shape, is horizontally coupled to an inner rear end rotary shaft of a rear wheel fixing frame in order to control the rotation of the rear wheels.

Next, the twin baby carriage frame 20 according to the present invention will be described.

Here, the twin baby carriage frame 20 has a structure in which support frames, each of which has a rectangular rim shape that is formed horizontally, are coupled to each other in a symmetrical fashion, and an inclination frame, which has a shape formed by connecting the rear ends of three frames in a perpendicular manner so that they extend parallel to each other in the inclined state. The front surface of the inclination frame is configured to have a hinge structure, and the frames are coupled to each other in order to form a second main frame. A wheel unit is formed at the left and right sides of the front surface and the rear surface of the support frame in a symmetrical fashion, and a seat frame is coupled to the left and right sides of the inner surface of a side inclination bracket, which is coupled to one side of the middle of the inclination frame.

The twin baby carriage frame includes a second main frame 400 and a wheel unit 500.

The second main frame 400 includes a support frame 410, which is formed horizontally and has a rectangular rim shape, an inclination frame 420, which has a shape formed by connecting the rear ends of three frames in a perpendicular manner so that they extend parallel to each other in the inclined state, and the front surface of which is configured to have a hinge structure such that the front of the side surface thereof forms an angle through the hinge structure in order to completely support the main body of the baby carriage. A foldable rotation locking device 430 is fixedly coupled to one side of the support frame and movably coupled to one side of the inclination frame at the middle thereof and at the left and right sides in a symmetrical fashion so as to be movable in the upward or downward direction in response to the rotation of the inclination frame, and a side inclination bracket 440 is coupled to one side of the middle of the side inclination frame. The second main frame is folded or unfolded about the lower end of the front surface of the second main frame through the hinge structure thereof, whereby the shape of the second main frame is changed.

Here, the support frame 410 is a frame that constitutes the lower end of the baby carriage, has a rectangular rim shape, and is formed in the horizontal direction, and two support plates are coupled to each other inside the support frame in a symmetrical fashion so as to extend in the forward-rearward longitudinal direction thereof.

A main rotary shaft 411 is formed in the front of the support frame so as to extend in the leftward-rightward direction, and supports shaft coupling of the side inclination frame.

Here, the side inclination frame 320, which is a frame formed by connecting the rear ends of three frames in a perpendicular manner so that they extend parallel to each other in the inclined state, is coupled to a main rotary shaft formed at the front of the support frame in the leftward-rightward direction via a hinge structure. The side inclination frame also serves to support the two seat frames, which are coupled to the left inner surface of one side of the middle thereof and to the right inner surfaces of one side of the middle thereof. The side inclination frame includes an outer cylindrical frame 421 and a handle frame 422.

At this time, the outer cylindrical frame 421 has a hollow cylindrical shape formed at the left and right sides and the middle of the front thereof. The end of the outer cylindrical frame is axially coupled to the main rotary shaft, formed at the front of the support frame, so as to be rotated. The outer cylindrical frame constitutes the lower end of the side inclination frame, receives the lower ends of the left and right sides of the handle frame in the inward direction, and serves to support the upward and downward movement of the handle frame.

At this time, the handle frame 422 is a frame having a shape formed by connecting the rear ends of three frames in a perpendicular manner so that they extend parallel to each other in the inclined state. The lower end of the front of the handle frame is inserted into the outer cylindrical frame, which is formed at the left and right sides and the middle thereof, in the longitudinal direction, and a handle length-adjustment button 422a is formed at the upper end of the handle frame in the inward direction in order to adjust the length of a handle.

Here, the foldable rotation locking device 430 is formed between the support frame and the side inclination frame, which are coupled to each other at the left and right sides thereof and at the middle thereof in a symmetrical fashion, and is connected to a locking switch located at the lower end of one side of the middle of the side inclination frame in order to fix the side inclination frame, which can be rotated in the upward or downward direction according to the axial rotation of the main rotary shaft.

Here, the side inclination bracket 440 is coupled to one side of the left and right sides and the middle of the side inclination frame in a symmetrical fashion. The side inclination bracket is provided in the upper end surface thereof, which is formed horizontally in the inward direction, with a coupling pin insertion recess 441, into which the lower end of a coupling body 211a of a baby carriage coupling unit is inserted, a detachment pin 442 is formed on the middle of the lower end of the inside of the coupling pin insertion recess, and a wagon seat coupling bar 443 is formed so as to protrude in the lower-end direction.

At this time, the coupling pin insertion recess 441 is a recess formed in the middle of the upper end surface of the side inclination bracket 440 in the vertical direction, and the lower end of the coupling body 211a is vertically inserted thereinto, whereby the coupling body is supported.

At this time, the detachment pin 442 is a circular pin formed inside one side of the middle of the lower end of the coupling pin insertion recess 441 in the leftward-rightward direction, and is detached from or coupled to the coupling hook 211c-1, located at the lower end of the coupling hook frame 211c formed in the coupling body, in order to detach and couple the baby carriage seat frame.

At this time, the wagon seat coupling bar 443 is a bar-shaped frame coupled to one side of the middle of the lower end of the side inclination bracket 440 in the vertical direction, and couples one side of the middle of the wagon seat frame 220 to the inside of the middle of the lower end thereof in order to support the wagon seat frame.

In the case in which the baby carriage seat frame 210 is optionally coupled into the coupling pin insertion recess 441 formed in the upper end of the side inclination bracket 440 according to the present invention, the baby carriage according to the present invention may be used in the form of a twin baby carriage. In the case in which the wagon seat frame 420 is coupled to the wagon seat coupling bar 443 formed at the lower end thereof, the baby carriage according to present invention may be used in the form of a twin wagon.

Consequently, the two baby carriage seat frames 210 may be detachably coupled to the second main frame such that the baby carriage according to the present invention is used in the form of a twin baby carriage, and the two wagon seat frames 220 may be detachably coupled to the second main frame such that the baby carriage according to the present invention is used in the form of a twin wagon. In addition, one of the baby carriage seat frames 210 and one of the wagon seat frames 210 may be coupled to each other such that the baby carriage according to the present invention is used in the form of a baby carriage and a wagon, whereby the twin baby carriage and the twin wagon may be interchangeably used depending on the age of children or depending on the purpose of the user.

In addition, when the wagon seat frame 220 is coupled to the side inclination bracket 440, a canopy frame 215 may be inserted into the coupling pin insertion recess 441.

The wheel unit 500 is constituted by driving wheels coupled to the left and right sides of the front and the rear of the support frame in a symmetrical fashion in order to drive the baby carriage.

The wheel unit includes a front wheel driving unit 510 and a rear wheel driving unit 520.

The front wheel driving unit 510 is coupled to the left and right ends of the lower end of the front of the support frame in a symmetrical fashion. A front wheel detachment switch, which protrudes in a push fashion in order to decouple front wheels, is formed on the side surface of the upper end of the front wheel driving unit. The front wheel driving unit supports the lower end of the front surface of the child wagon and provides power to move the child wagon.

The rear wheel driving unit 520 is coupled to the left and right ends of the lower end of the front of the support frame in a symmetrical fashion. A brake middle shaft, which has a bar shape, is horizontally coupled to the inner central axes of rear wheels formed at the left and right sides in a symmetrical fashion, a brake pad is coupled to the middle of the brake middle shaft, and a brake rotation shaft, which has a bar shape, is horizontally coupled to an inner rear end rotary shaft of a rear wheel fixing frame in order to control the rotation of the rear wheels.

Hereinafter, the operation of the baby carriage having improved convenience of use according to the present invention will be described in detail.

Above all, one of the single baby carriage frame and the twin baby carriage frame is optionally configured depending on the number of children.

First, the single baby carriage frame is optionally configured, and then the baby carriage type baby carriage seat frame is coupled to the first main frame.

At this time, the lower end of the baby carriage coupling unit of the baby carriage seat frame is vertically inserted into the coupling pin insertion recess of the side inclination bracket such that the detachment pin is coupled and fixed to the coupling hook.

Subsequently, the pulling rotation control handle of the baby carriage rotation handle unit is pulled, whereby the inner connection wire, which is connected to the inside thereof, rotates the gear rotation frame and the rotary gear while moving the gear rotation frame and the rotary gear inwards in order to rotate the baby carriage seat frame and to set the fixing angle thereof.

Here, when the pulling rotation control handle is released, the inner connection wire is released, and the gear rotation frame and the rotary gear are returned to the original positions thereof, whereby the rotation thereof is stopped and fixed.

Subsequently, one of the upper-end cover canopy and the dome-shaped canopy is optionally installed at the upper end of the side inclination bracket depending on the state in which the baby carriage seat frame is used.

Second, the single baby carriage frame is optionally configured, and then the wagon type wagon seat frame is coupled to the first main frame.

At this time, the wagon coupling unit of the wagon seat frame is coupled and fixed to the inner surface of the wagon seat coupling bar of the side inclination bracket.

Subsequently, the wagon auxiliary frame, formed at the left and right sides of the front and rear of the wagon seat frame in the lower-end direction, is coupled and fixed to the side surface of the support frame, and the upper-end cover canopy is installed at the upper end of the side inclination bracket.

Third, the twin baby carriage frame is optionally configured, and then the two baby carriage type baby carriage seat frames are coupled to the inside of the second main frame in the leftward-rightward direction.

At this time, the lower end of the baby carriage coupling unit of the baby carriage seat frame is vertically inserted into the coupling pin insertion recess of the side inclination bracket such that the detachment pin is coupled and fixed to the coupling hook.

Subsequently, the pulling rotation control handle of the baby carriage rotation handle unit is pulled, whereby the inner connection wire, which is connected to the inside thereof, rotates the gear rotation frame and the rotary gear while moving the gear rotation frame and the rotary gear inwards in order to rotate the baby carriage seat frame and to set the fixing angle thereof.

Here, when the pulling rotation control handle is released, the inner connection wire is released, and the gear rotation frame and the rotary gear are returned to the original positions thereof, whereby the rotation thereof is stopped and fixed.

Subsequently, one of the upper-end cover canopy and the dome-shaped canopy is optionally installed at the upper end of the side inclination bracket depending on the state in which the baby carriage seat frame is used.

Fourth, the twin baby carriage frame is optionally configured, and the two wagon type wagon seat frames are coupled to the inside of the second main frame in the leftward-rightward direction.

At this time, the wagon coupling unit of the wagon seat frame is coupled and fixed to the inner surface of the wagon seat coupling bar of the side inclination bracket.

Subsequently, the wagon auxiliary frame, formed at the left and right sides of the front and rear of the wagon seat frame in the lower-end direction, is coupled and fixed to the side surface of the support frame, and the upper-end cover canopy is installed at the upper end of the side inclination bracket.

INDUSTRIAL APPLICABILITY

The present invention provides a baby carriage having improved convenience of use configured to have a structure in which a baby carriage frame and a wagon frame are detachably coupled to a single baby transportation frame so as to be interchangeably used depending on the age of children. The baby carriage frame and the wagon frame are optionally coupled to the left side and the right side of a single frame, whereby the baby carriage can be easily used in homes having a great age difference between children and homes having multiple children. The baby carriage seat and wagon seat are compatible on one frame due to the detachable coupling of the seats. Therefore, the baby carriage can be used without replacement during growth from a baby to a child and thus initial purchase expense is reduced, and it is possible for a single caregiver to operate the baby carriage, carrying a maximum of four children using a single frame. Consequently, the present invention has industrial applicability.

The invention claimed is:

1. A baby carriage having improved convenience of use, the baby carriage comprising a baby carriage frame,
   wherein the baby carriage frame includes:
   a main frame including a support frame formed horizontally and having a rectangular rim shape, a side inclination frame having a bracket shape and coupled to the support frame at a front surface thereof via a hinge structure such that the support frame and the side inclination frame form an angle and support a main body of the baby carriage;
   a foldable rotation locking device fixedly coupled to one side of the support frame and movably coupled to one side of the side inclination frame in a symmetrical fashion so as to be movable in an upward-downward direction in response to rotation of the side inclination frame;
   a side inclination bracket coupled to one side of a middle of the side inclination frame, the main frame being folded or unfolded about a lower end of a front surface of the main frame through the hinge structure, thereby a shape of the main frame is changeable;
   a baby carriage seat frame coupled to the side inclination frame for supporting a baby carriage seat coupled to the baby carriage seat frame; and
   a wheel assembly having driving wheels coupled to left and right sides of a front surface and a rear surface of the support frame in a symmetrical fashion in order to drive the baby carriage,
   wherein the baby carriage seat frame is vertically inserted into a coupling pin insertion recess disposed in an upper end of the side inclination bracket, and supports the baby carriage seat, which is rotatable in the upward-downward direction about a rotary shaft disposed at a middle thereof in a leftward-rightward direction, and
   wherein the baby carriage seat frame includes:
   a baby carriage coupling assembly, which is formed as a rectangular frame, an upper end of which is formed in a cylindrical shape erected laterally, and a lower end of which coincides with a circumference of the coupling pin insertion recess of the side inclination bracket, the baby carriage coupling assembly configured to couple the baby carriage seat frame to the side inclination frame;
   a baby carriage rotation control assembly, which has a cylindrical shape, a middle of which is erected laterally, and is coupled to an inner surface of an upper end of the baby carriage coupling assembly, which is formed at left and right sides thereof, a protruding support for supporting a baby carriage seat main frame being formed at each of a front surface and a rear surface of the baby carriage rotation control assembly, a baby handle bar fixing assembly for fixing a baby handle bar being formed at an upper end surface of the baby carriage rotation control assembly, an inside of the baby carriage rotation control assembly being connected to a baby carriage rotation handle assembly in order to rotate the baby carriage seat frame;
   the baby carriage seat main frame having a rectangular rim shape in which a bracket shaped frame is coupled to a front surface and a rear surface of the baby carriage rotation control assembly in a symmetrical fashion, the baby carriage seat main frame being configured to support the baby carriage seat;
   a baby carriage rotation handle assembly having a handle disposed at a middle of a rear surface of the baby carriage seat main frame in an outward direction and a wire disposed along an inside of a rear of the baby carriage seat main frame in order to rotate or fix the baby carriage rotation control assembly; and
   a canopy frame including a plurality of frames, each of which is coupled to one side of a rear of a side surface of the baby carriage coupling assembly in a symmetrical fashion and each of which has a bracket shape, the canopy frame being rotatable in the upward-downward direction so as to be unfolded at an upper end of the baby carriage seat frame in a fan shape or to be folded.

2. The baby carriage according to claim 1, wherein the baby carriage coupling assembly includes:
   a coupling body having a lower end configured to be vertically inserted into or detached from the coupling pin insertion recess disposed in the upper end surface of the side inclination bracket, so as to be coupled thereto or detached therefrom, the baby carriage rotation control assembly being coupled to an inner surface of the coupling body;
   a decoupling switch protruding from one side of a front of an upper end of the coupling body, wherein the decoupling switch is a push button;
   a coupling hook frame disposed in the coupling body, coupled to a lower end of an inside of the decoupling switch, and having a coupling hook disposed at a lower end of the coupling hook frame so as to be detachably coupled to a detachment pin disposed at the inside of the side inclination frame; and
   a compression spring disposed at one side of a front of the inner surface of the coupling body in a forward-rearward direction, the compression spring being configured to be compressed and restored according to forward and rearward movements of the coupling hook frame in order to return the decoupling switch and the coupling hook frame to original positions thereof.

3. The baby carriage according to claim 1, wherein the baby carriage rotation handle assembly comprises:
- a pulling rotation control handle having a rotary handle shape formed at the middle of the rear surface of the baby carriage seat main frame, left and right ends of the pulling rotation control handle being coupled to the rotary shaft;
- a torsion spring, one side of which is connected to an inside of the middle of the rear surface of the baby carriage seat main frame and another side of which is connected to an inside of the pulling rotation control handle in order to generate a rotary restoring force of the pulling rotation control handle; and
- an inner connection wire connected to an inside of each of left and right sides of the pulling rotation control handle,
- wherein the baby carriage rotation control assembly includes a gear rotation frame,
- wherein a coupling protrusion, which is disposed at an end of the inner connection wire, is inserted into a wire coupling protrusion recess disposed in the gear rotation frame, and
- wherein pulling and release are performed through a rotation of the pulling rotation control handle.

4. The baby carriage according to claim 1, wherein the canopy frame optionally comprises one of:
- an upper-end cover canopy, each of which has a bracket shape, the upper-end cover canopy being rotated in three axial directions based on a side surface thereof in order to set an angle of the canopy, the upper-end cover canopy configured to support a baby carriage canopy sheet covering an upper end of the baby carriage frame; and
- a dome-shaped canopy, each of which has a bracket shape, the dome-shaped canopy being unfolded in a fan shape so as to be coupled to an upper end of a front and an upper end of a rear of the baby carriage coupling assembly in a symmetrical fashion, dome-shaped canopy parts being detachably coupled to each other along middle circumferences thereof that contact each other using a zipper so as to have a dome shape, the dome-shaped canopy configured to support a baby carriage canopy sheet covering an entire upper end surface of the baby carriage frame.

* * * * *